US012578718B2

(12) United States Patent
Muro

(10) Patent No.: US 12,578,718 B2
(45) Date of Patent: Mar. 17, 2026

(54) MODEL CONSTRUCTION SUPPORT SYSTEM AND MODEL CONSTRUCTION SUPPORT METHOD

(71) Applicant: Hitachi, Ltd., Tokyo (JP)

(72) Inventor: Keiro Muro, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1055 days.

(21) Appl. No.: 17/683,118

(22) Filed: Feb. 28, 2022

(65) Prior Publication Data

US 2023/0055564 A1 Feb. 23, 2023

(30) Foreign Application Priority Data

Aug. 18, 2021 (JP) ................................. 2021-133298

(51) Int. Cl.
*G05B 23/02* (2006.01)
(52) U.S. Cl.
CPC ..... *G05B 23/0283* (2013.01); *G05B 23/0281* (2013.01)
(58) Field of Classification Search
None
See application file for complete search history.

(56) References Cited

U.S. PATENT DOCUMENTS

| | | | |
|---|---|---|---|
| 10,318,674 B2 | 6/2019 | Morgan et al. | |
| 10,664,698 B2 | 5/2020 | Banerjee et al. | |
| 11,907,809 B2 * | 2/2024 | Katsuki .................. | G06N 20/00 |
| 2017/0061331 A1 * | 3/2017 | Steinberg ............ | G06F 16/2365 |

FOREIGN PATENT DOCUMENTS

| | | |
|---|---|---|
| JP | 2011-034457 A | 2/2011 |
| JP | 2012-103841 A | 5/2012 |

* cited by examiner

*Primary Examiner* — Michael J Huntley
*Assistant Examiner* — Paul J Breene
(74) *Attorney, Agent, or Firm* — PROCOPIO, CORY, HARGREAVES & SAVITCH LLP

(57) ABSTRACT

A model construction support system supports searching for a feature used to construct a prediction model that outputs an objective variable related to a predicted event for a machine based on explanatory variables, and a division method for dividing the explanatory variables into groups to improve calculation accuracy of the objective variables based on the prediction model. The system divides the explanatory variables into a plurality of groups, calculates accuracy of the features set based on the explanatory variable in the groups, and calculates a score of the feature in the groups based on the accuracy and a support ratio of the explanatory variable to all of the explanatory variables before division. The system calculates accuracy of a group division feature used to divide the explanatory variables, and a score in the groups based on the score and the accuracy in the groups.

20 Claims, 37 Drawing Sheets

DIAGRAM SHOWING NECESSITY OF GROUP DIVISION

| NORMAL DRIVE | BLOCK |
|---|---|

| FAILURE | STRATEGIC REPLACEMENT |
|---|---|

·REPLACE DRIVE HAVING DETERIORATION DEGREE OF 95% OR MORE EVEN IF DRIVE HAS NO FAILURE.
·AT THAT TIME, REPLACE DRIVE CONSTITUTING SAME RAID.

CAUSE OF FAILURE OBTAINED FROM REPAIR CENTER

| WRITE FAILURE | READ FAILURE | COMMUNICATION FAILURE | NO CAUSE DESCRIPTION |
|---|---|---|---|

| MADE BY COMPANY A | MADE BY COMPANY B | | | UNKNOWN CAUSE | UNCOLLECTED |
|---|---|---|---|---|---|

·FOR PRODUCT MADE BY COMPANY B, CERTAIN MEASUREMENT VALUE IS NOT MEASURED

DIAGRAM SHOWING NECESSITY OF GROUP DIVISION

·OLD MODEL HAS DIFFERENT FORMULAS FOR CERTAIN MEASUREMENT VALUE

| OLD MODEL | | NEW MODEL | |
|---|---|---|---|
| 2TB MODEL | 1TB MODEL | 2TB MODEL | 1TB MODEL |

·CERTAIN MEASUREMENT VALUE NEEDS TO BE STANDARDIZED BY DATA CAPACITY (1TB/2TB)

FIG. 1A

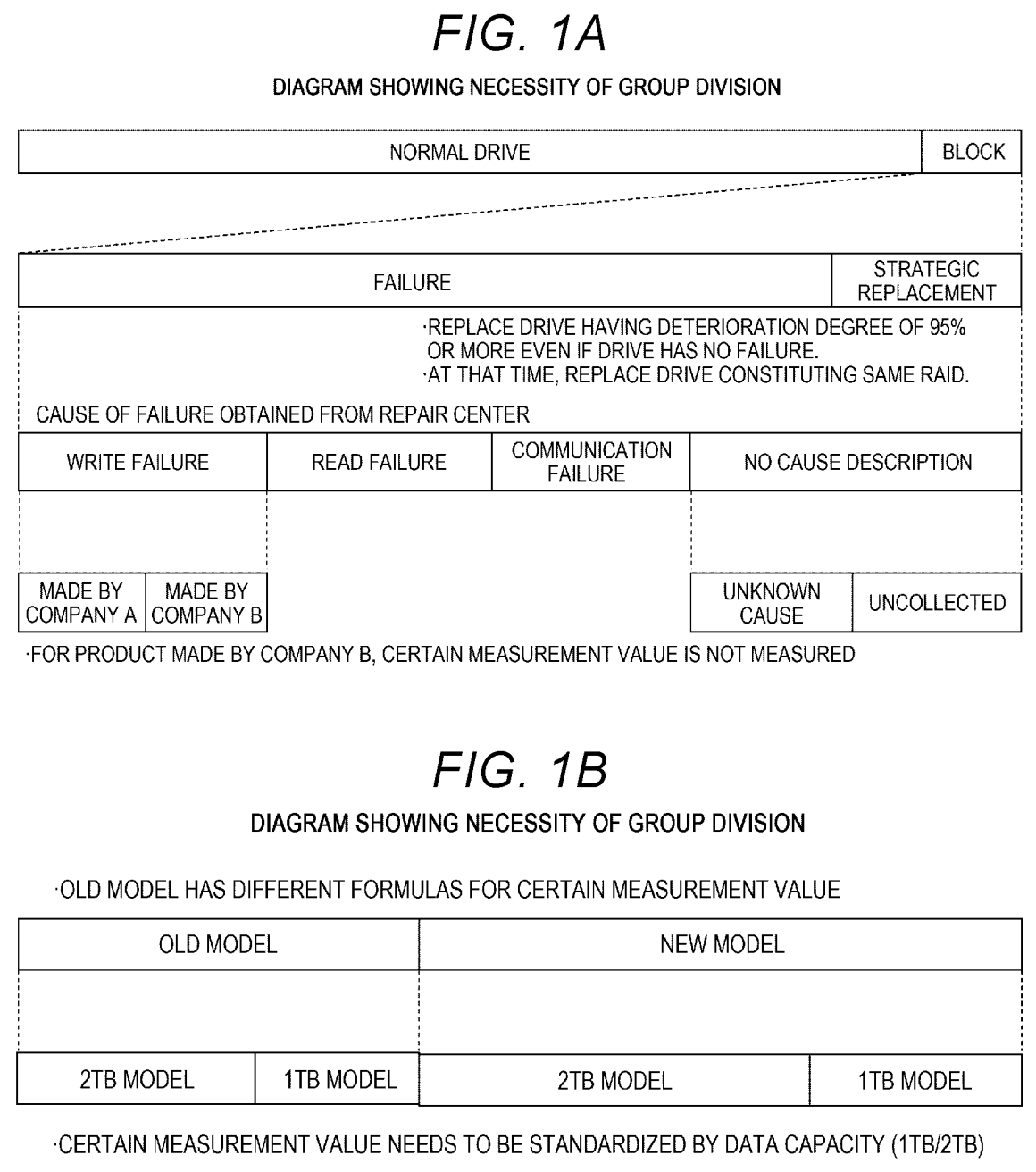

DIAGRAM SHOWING NECESSITY OF GROUP DIVISION

| NORMAL DRIVE | BLOCK |
|---|---|

| FAILURE | STRATEGIC REPLACEMENT |
|---|---|

·REPLACE DRIVE HAVING DETERIORATION DEGREE OF 95% OR MORE EVEN IF DRIVE HAS NO FAILURE.
·AT THAT TIME, REPLACE DRIVE CONSTITUTING SAME RAID.

CAUSE OF FAILURE OBTAINED FROM REPAIR CENTER

| WRITE FAILURE | READ FAILURE | COMMUNICATION FAILURE | NO CAUSE DESCRIPTION | |
|---|---|---|---|---|
| | | | | |
| MADE BY COMPANY A | MADE BY COMPANY B | | UNKNOWN CAUSE | UNCOLLECTED |

·FOR PRODUCT MADE BY COMPANY B, CERTAIN MEASUREMENT VALUE IS NOT MEASURED

FIG. 1B

DIAGRAM SHOWING NECESSITY OF GROUP DIVISION

·OLD MODEL HAS DIFFERENT FORMULAS FOR CERTAIN MEASUREMENT VALUE

| OLD MODEL | | NEW MODEL | |
|---|---|---|---|
| | | | |
| 2TB MODEL | 1TB MODEL | 2TB MODEL | 1TB MODEL |

·CERTAIN MEASUREMENT VALUE NEEDS TO BE STANDARDIZED BY DATA CAPACITY (1TB/2TB)

EXAMPLE OF DIVIDING POPULATION INTO GROUPS

MODEL CONSTRUCTION SUPPORT INFORMATION 600

MODEL CONSTRUCTION SUPPORT SYSTEM

1

TIME-SERIES DATA    101

1013   MEASUREMENT VALUE GROUP 1011      1012

| MACHINE ID | TIME STAMP | MEASUREMENT VALUE 1 | MEASUREMENT VALUE 2 | ... |
|------------|------------|---------------------|---------------------|-----|
| A1 | 1/1 00:00 | 1.1 | TYPE_A | ... |
| A1 | 1/1 12:00 | 1.8 | TYPE_A | ... |
| : | : | : | : | : |
| A2 | 1/1 00:00 | 1.3 | TYPE_B | ... |
| : | : | : | : | : |

GROUP INFORMATION   103a 1031a    1032a

| MACHINE ID | GroupSetName |
|------------|--------------|
| A1 | Group1 |
| A2 | Group2 |
| A3 | Group1 |
| A4 | Group3 |
| : | : |

GROUP INFORMATION  103b

| MACHINE ID | OBJECTIVE VARIABLE |
|------------|--------------------|
| A1         | OK                 |
| A2         | NG                 |
| A3         | OK                 |
| A4         | NG                 |
| :          | :                  |

1031b   1032b

GROUP INFORMATION  103c

| MACHINE ID | FAILURE REASON  |
|------------|-----------------|
| A1         | DETERIORATION   |
| A2         | MEMORY FAILURE  |
| A3         | DETERIORATION   |
| A4         | MEMORY FAILURE  |
| :          | :               |

1031c   1032c

FEATURE LIBRARY  104

| Logic   | Dimension | Lambda Expression                        |
|---------|-----------|------------------------------------------|
| average | 1         | y -> average(y)                          |
| slope   | 2         | x,y-> (max(y)−min(y))/(max(x)−min(x))    |
| :       | :         | :                                        |

1041   1042   1043

FEATURE TABLE

| MACHINE ID | AVERAGE VALUE OF MEASUREMENT VALUE 1 | SLOPE OF MEASUREMENT VALUE 1 | MEASUREMENT VALUE 2 | · · · |
|---|---|---|---|---|
| A1 | 1.4 | 0.5 | TYPE_A | · · · |
| A2 | 1.5 | 0.3 | TYPE_A | · · · |
| : | : | : | : | : |

PROCESS TREE (UML DIAGRAM)

FIG. 14B
ATTRIBUTE OF COMPONENTS OF PROCESS TREE
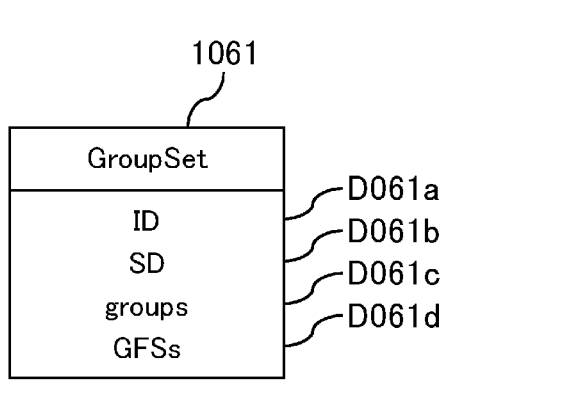
1061
GroupSet
ID — D061a
SD — D061b
groups — D061c
GFSs — D061d
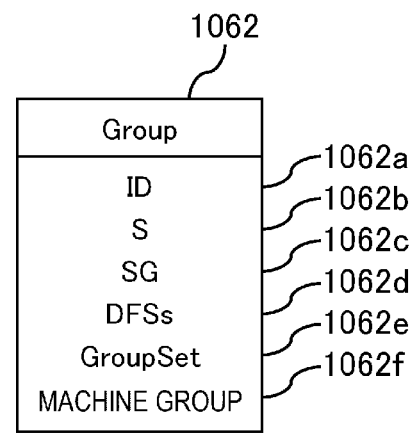
1062
Group
ID — 1062a
S — 1062b
SG — 1062c
DFSs — 1062d
GroupSet — 1062e
MACHINE GROUP — 1062f
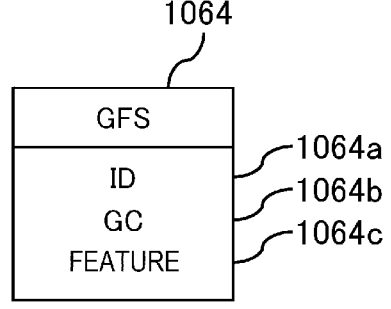
1064
GFS
ID — 1064a
GC — 1064b
FEATURE — 1064c
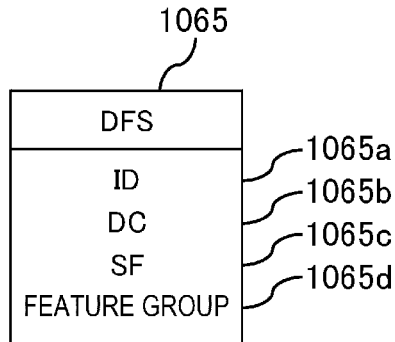
1065
DFS
ID — 1065a
DC — 1065b
SF — 1065c
FEATURE GROUP — 1065d

MAIN PROCESSING                                    S500

FIG. 16

LIST OF OPERATIONS ON PROCESS TREE 1611                    1612                    1613

| REFERENCE NUMERAL | OPERATION CONTENT | EXAMPLE OF CHANGE IN PROCESS TREE |
|---|---|---|
| S511 | DATA REGISTRATION PROCESSING | FIG. 17A |
| S512 | OBJECTIVE VARIABLE REGISTRATION PROCESSING | FIG. 17D, FIG. 17G, FIG. 17H |
| S524 | IDENTIFICATION FEATURE (DFS) REGISTRATION PROCESSING | FIG. 17B |
| S524 | IDENTIFICATION FEATURE (DFS) REGISTRATION PROCESSING (SECOND TIME) | FIG. 17C |
| S525 | GROUP DIVISION PROCESSING | FIG. 17D, FIG. 17G, FIG. 17H |
| S526 | GROUP DIVISION FEATURE (GFS) REGISTRATION PROCESSING | FIG. 17E |
| S526 | GROUP DIVISION FEATURE (GFS) REGISTRATION PROCESSING (SECOND TIME) | FIG. 17F |
| S527 | GFS REGISTRATION AND GROUP DIVISION PROCESSING BASED ON GFS | FIG. 17D, FIG. 17E |
| S528 | OBJECTIVE VARIABLE CHANGE PROCESSING | FIG. 17D, FIG. 17G, FIG. 17H |
| S529 | TIME-SERIES DATA CHANGE PROCESSING | — |

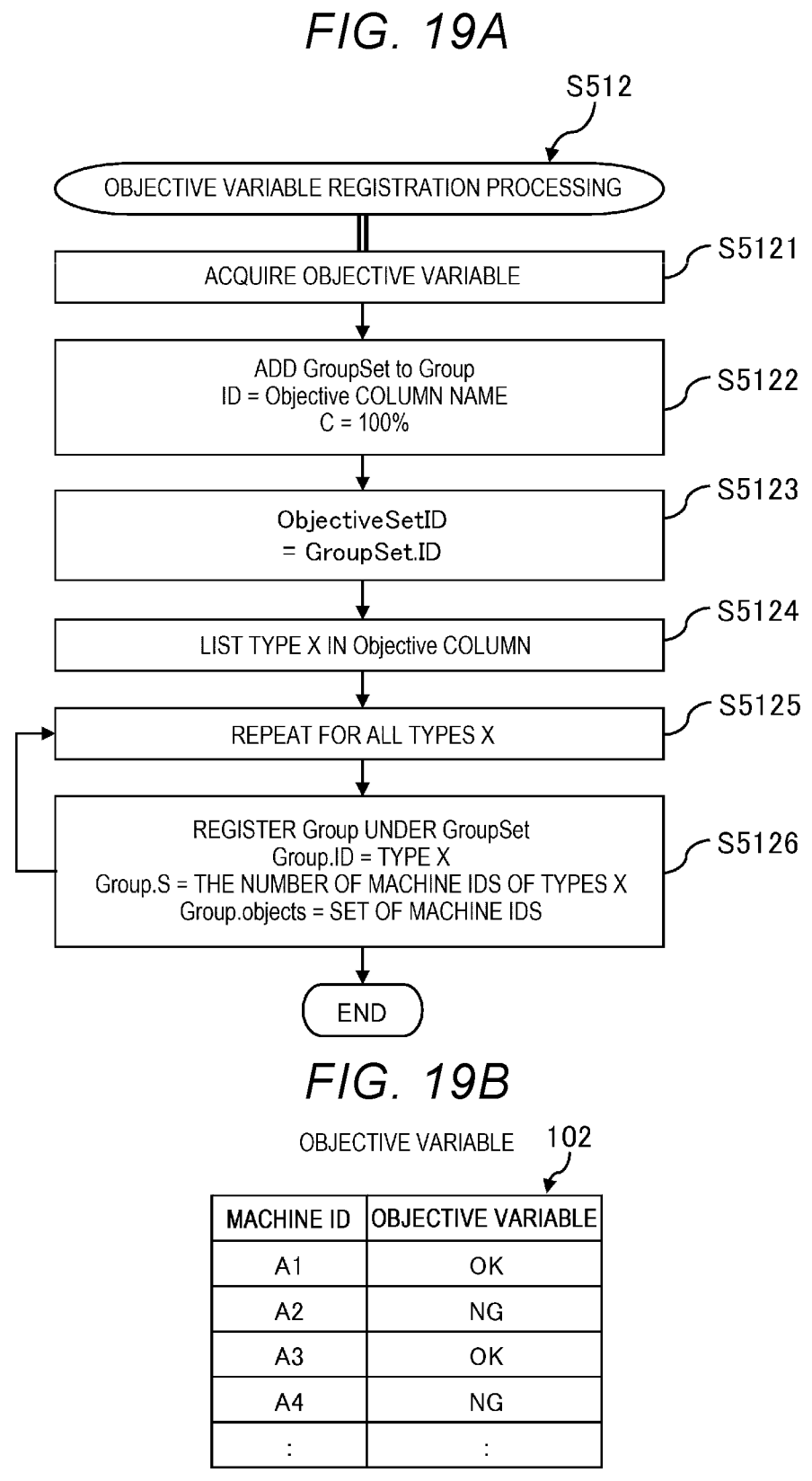

( OBJECTIVE VARIABLE REGISTRATION PROCESSING )

| ACQUIRE OBJECTIVE VARIABLE | S5121 |

| ADD GroupSet to Group<br>ID = Objective COLUMN NAME<br>C = 100% | S5122 |

| ObjectiveSetID<br>= GroupSet.ID | S5123 |

| LIST TYPE X IN Objective COLUMN | S5124 |

| REPEAT FOR ALL TYPES X | S5125 |

| REGISTER Group UNDER GroupSet<br>Group.ID = TYPE X<br>Group.S = THE NUMBER OF MACHINE IDS OF TYPES X<br>Group.objects = SET OF MACHINE IDS | S5126 |

( END )

FIG. 19B

OBJECTIVE VARIABLE    102

| MACHINE ID | OBJECTIVE VARIABLE |
|------------|--------------------|
| A1 | OK |
| A2 | NG |
| A3 | OK |
| A4 | NG |
| : | : |

STRUCTURE OF PROCESS TREE AFTER OBJECTIVE
VARIABLE REGISTRATION

FIG. 23A

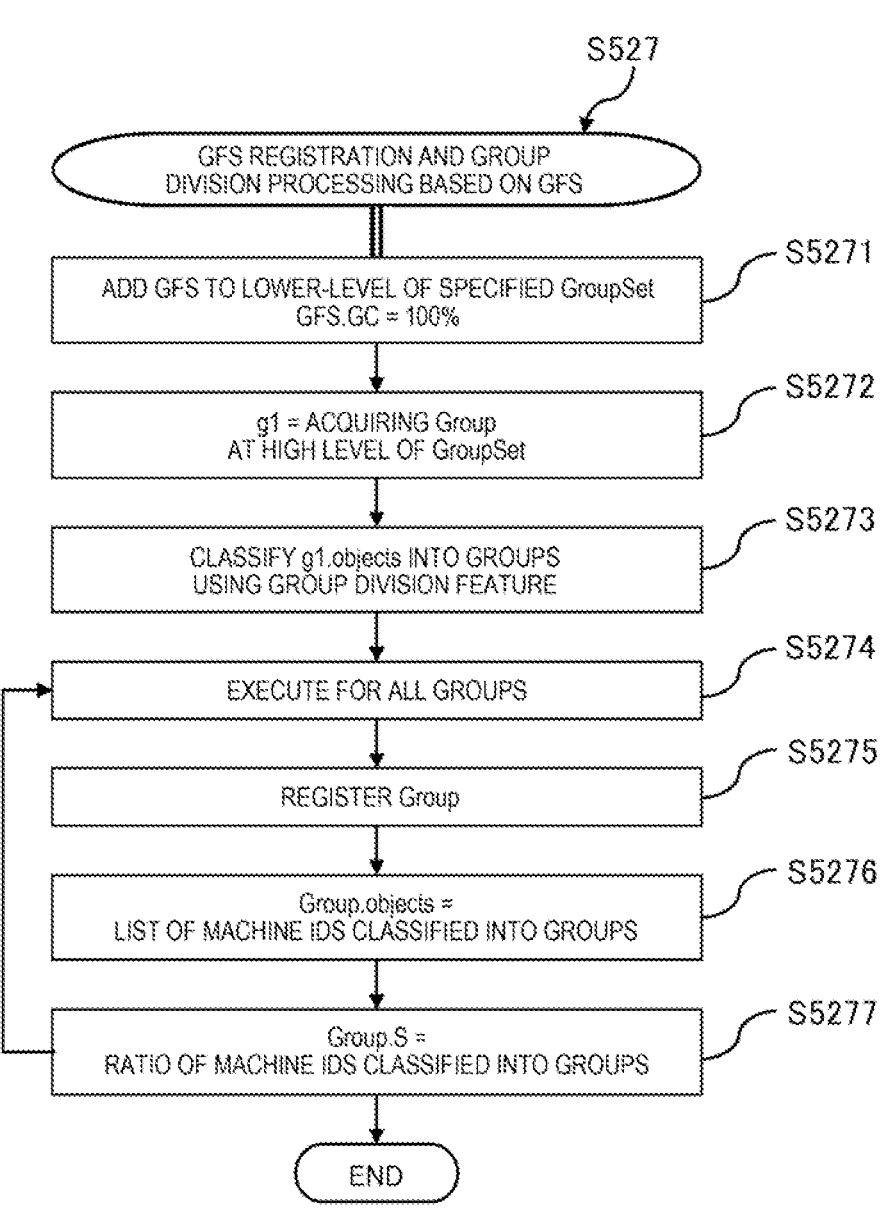

S527

GFS REGISTRATION AND GROUP
DIVISION PROCESSING BASED ON GFS

ADD GFS TO LOWER-LEVEL OF SPECIFIED GroupSet
GFS.GC = 100%     S5271 g1 = ACQUIRING Group
AT HIGH LEVEL OF GroupSet     S5272

CLASSIFY g1.objects INTO GROUPS
USING GROUP DIVISION FEATURE     S5273

EXECUTE FOR ALL GROUPS     S5274

REGISTER Group     S5275

Group.objects =
LIST OF MACHINE IDS CLASSIFIED INTO GROUPS     S5276

Group.S =
RATIO OF MACHINE IDS CLASSIFIED INTO GROUPS     S5277

END

STRUCTURE OF PROCESS TREE AFTER GROUP DIVISION BASED ON FEATURE

Figure 24B:
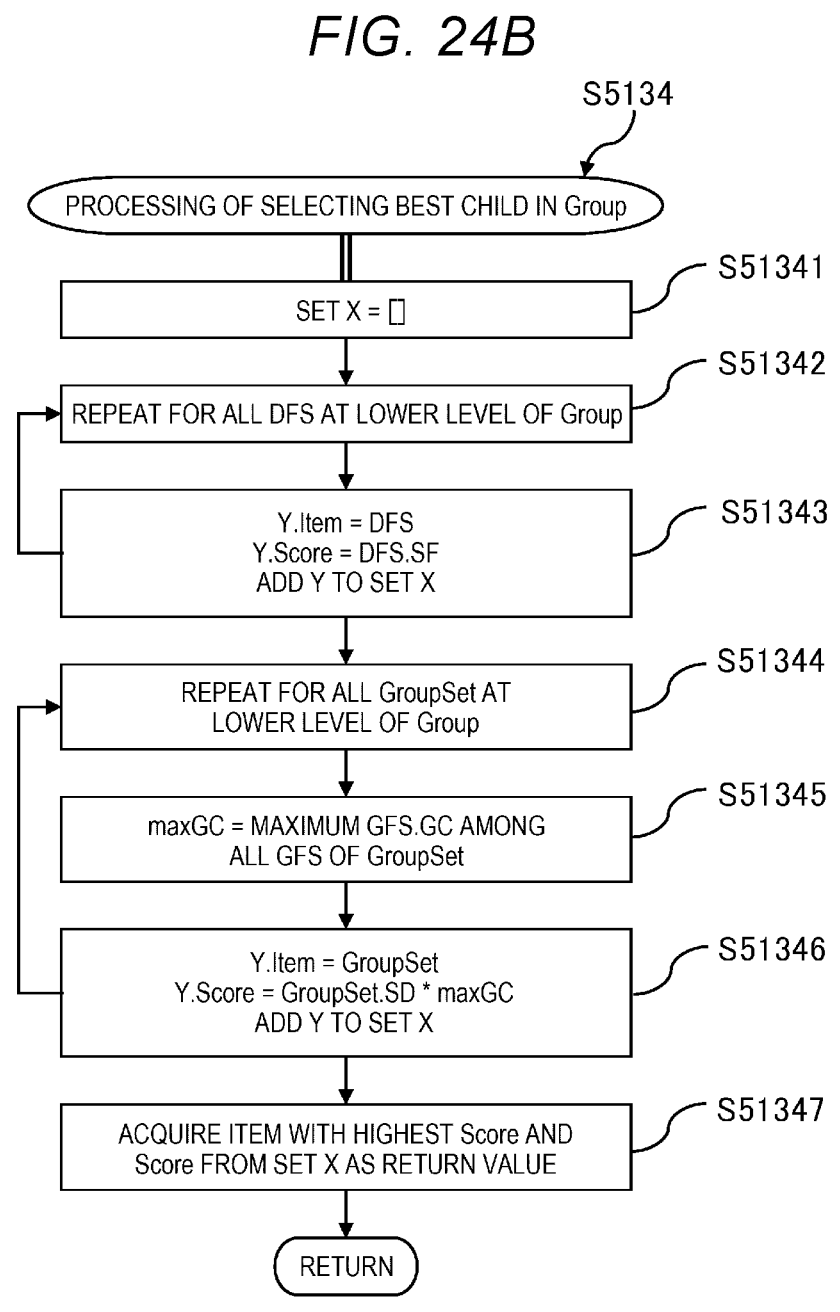

```
PROCESSING OF SELECTING BEST CHILD IN Group
```

SET X = ▯  — S51341

REPEAT FOR ALL DFS AT LOWER LEVEL OF Group  — S51342

Y.Item = DFS
Y.Score = DFS.SF
ADD Y TO SET X  — S51343

REPEAT FOR ALL GroupSet AT
LOWER LEVEL OF Group  — S51344 maxGC = MAXIMUM GFS.GC AMONG
ALL GFS OF GroupSet  — S51345

Y.Item = GroupSet
Y.Score = GroupSet.SD * maxGC
ADD Y TO SET X  — S51346

ACQUIRE ITEM WITH HIGHEST Score AND
Score FROM SET X AS RETURN VALUE  — S51347

RETURN

EXAMPLE OF PROCESS TREE BEFORE EXECUTION OF LATEST RESULT
ACQUISITION PROCESSING S522

EXAMPLE OF PROCESS TREE AFTER EXECUTION OF LATEST
RESULT ACQUISITION PROCESSING S522

FIG. 27B

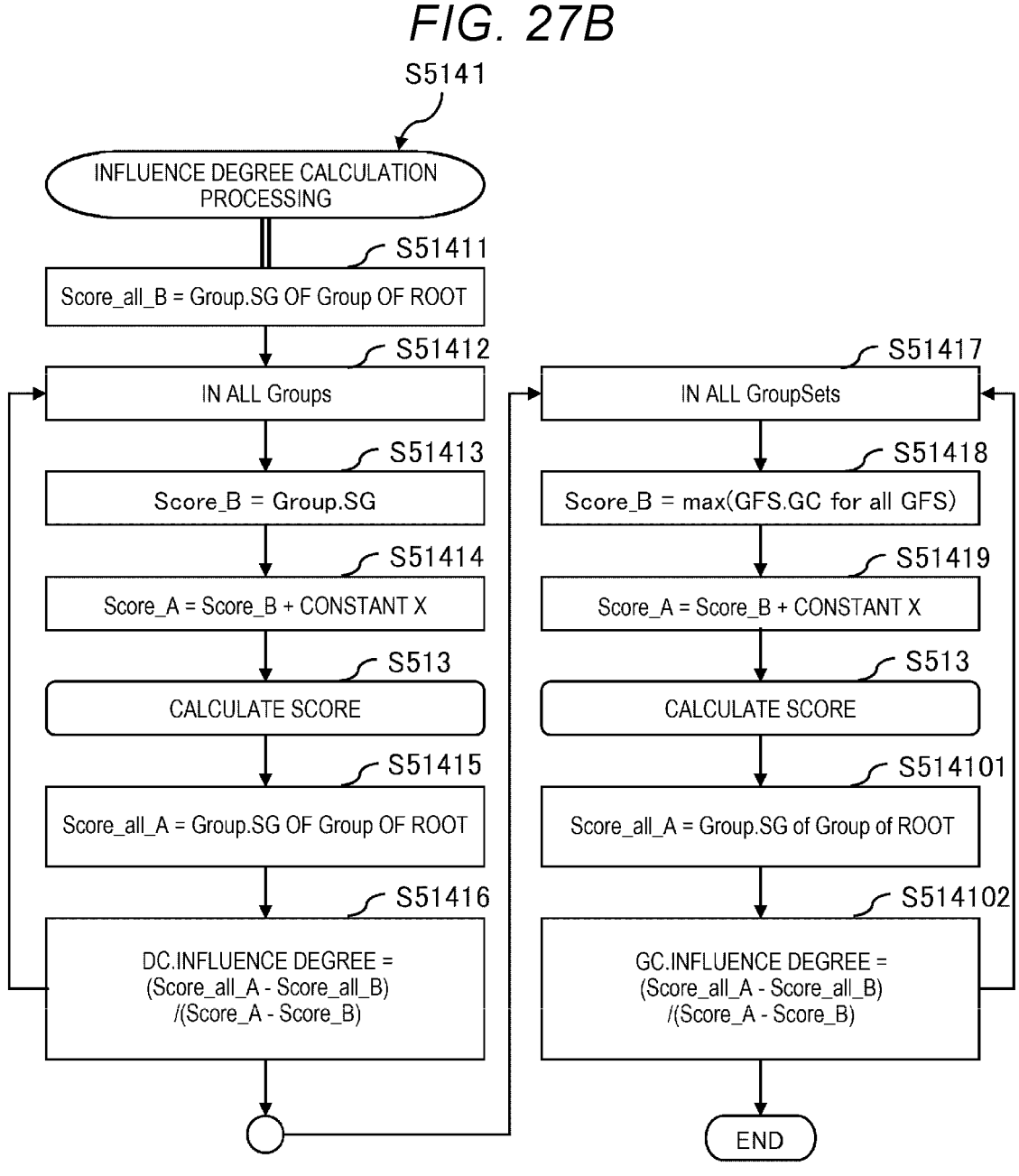

S5141

INFLUENCE DEGREE CALCULATION
PROCESSING

S51411
Score_all_B = Group.SG OF Group OF ROOT

S51412
IN ALL Groups

S51413
Score_B = Group.SG

S51414
Score_A = Score_B + CONSTANT X

S513
CALCULATE SCORE

S51415
Score_all_A = Group.SG OF Group OF ROOT

S51416
DC.INFLUENCE DEGREE =
(Score_all_A - Score_all_B)
/(Score_A - Score_B)

S51417
IN ALL GroupSets

S51418
Score_B = max(GFS.GC for all GFS)

S51419
Score_A = Score_B + CONSTANT X

S513
CALCULATE SCORE

S514101
Score_all_A = Group.SG of Group of ROOT

S514102
GC.INFLUENCE DEGREE =
(Score_all_A - Score_all_B)
/(Score_A - Score_B)

END

FIG. 28A
EXAMPLE OF PROCESSING OF EXECUTING GROUP DIVISION BASED ON
RESULT OF VISUALLY CLASSIFYING WAVEFORM IMAGE
2810
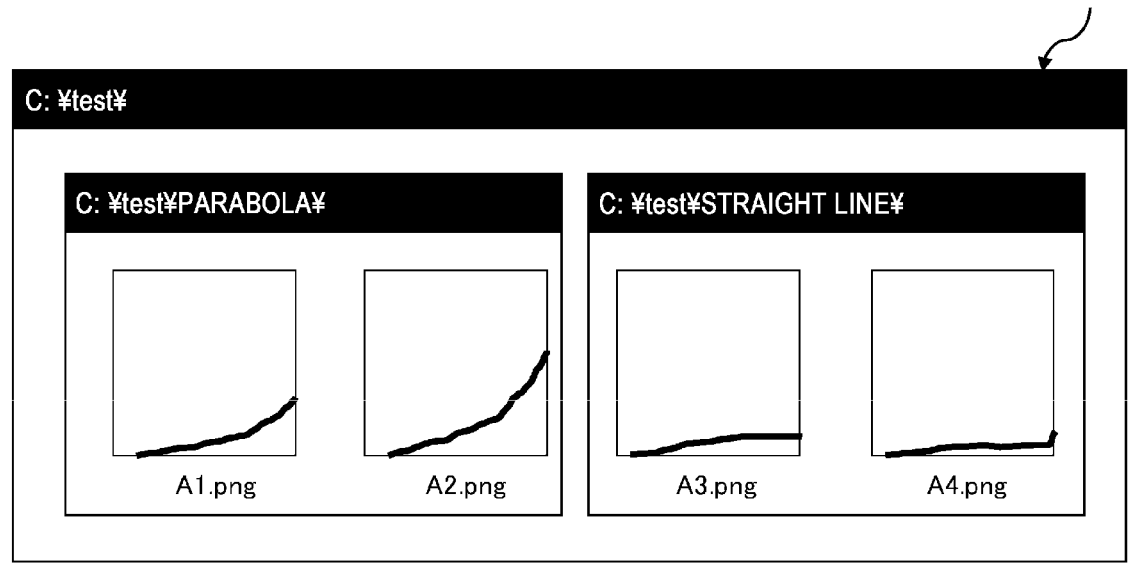
GROUP INFORMATION    103c
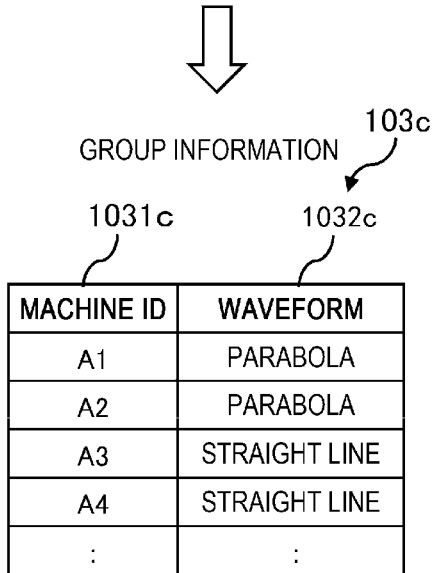
1031c      1032c
| MACHINE ID | WAVEFORM |
|------------|--------------|
| A1 | PARABOLA |
| A2 | PARABOLA |
| A3 | STRAIGHT LINE |
| A4 | STRAIGHT LINE |
| : | : |

EXAMPLE OF GENERATION METHOD FOR FEATURE TABLE

TIME-SERIES DATA

EXAMPLE OF GENERATION METHOD FOR FEATURE TABLE

TIME-SERIES DATA

FIG. 30

DESCRIPTION EXAMPLE OF FEATURE

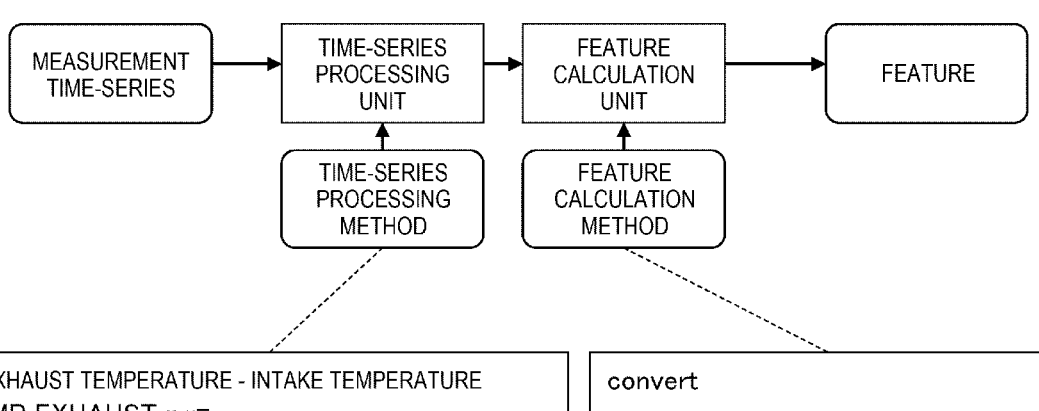

```
# EXHAUST TEMPERATURE - INTAKE TEMPERATURE
TEMP_EXHAUST_r ::=
  eval(TEMP_EXHAUST − TEMP_INTAKE)

# STANDARDIZE THE NUMBER OF WRITING BLOCKS
  FOR EACH SEMICONDUCTOR ELEMENT
WR_BLKCNT_r ::=
  eval(WR_BLKCNT / NO_OF_DIE)

# CALCULATE TIME DIFFERENCE OF 28 DAYS

WR_BLKCNT_dt28 ::=
  dydx_group(WR_BLKCNT, OPERATION_TM,
      HW_INFO_ID, 28)

# CORRECT PENETRATION BUG OF unsigned int
COMP_RATIO_DIST_FIX ::=
  fix_uint(COMP_RATIO_DIST, HW_INFO_ID)
```

$$dYdX(X, Y, k)[t] = \frac{Y[t] − Y[t − k]}{X[t] − X[t − k]}$$

```
convert

# MAXIMUM – MINIMUM IN LATEST 28 DAYS
minmax_28
# SLOPE IN IN LATEST 28 DAYS
slope_28
# QUADRATIC CURVE APPROXIMATION
  IN LATEST 28 DAYS
quadslope_28 from

MEMORY_ERRCNT
DEGRA_LEVEL
UPDATED_BLKCNT
RD_BLKCNT
```

EXAMPLE OF EXPLAINING NEED TO TRY FEATURE

TP: True Positive
FP: False Positive
TN: True Negative
FN: False Negative

MODEL CONSTRUCTION SUPPORT SYSTEM AND MODEL CONSTRUCTION SUPPORT METHOD

CROSS-REFERENCE TO RELATED APPLICATION

This application claims priority pursuant to Japanese patent application No. 2021-133298, filed on Aug. 18, 2021, the entire disclosure of which is incorporated herein by reference.

BACKGROUND

1. Technical Field

The present invention relates to a model construction support system and a model construction support method.

2. Related Art

Specification of U.S. patent Ser. No. 10/664,698 describes a processor implementation method of executing predictive analysis by extracting a feature from sensor data mapped to a knowledge base by deep learning and generating a machine learning model for analyzing the sensor data based on the extracted feature.

Specification of U.S. patent Ser. No. 10/318,674 describes an information processing device (computer) configured to ensure diversity of experiments obtained by trial and error and improving efficiency of the experiments. The information processing device generates experiment designs based on present data by a regression model, displays a graph showing matching between features in the experiment designs, and allows a user to select a feature.

JP-A-2012-103841 describes a system configured to reduce trial and error required for an analyst to select a set of data items to be analyzed in multidimensional data analysis using an online analytical processing (OLAP) tool. The above system recommends an analysis axis in multidimensional data analysis, calculates a degree of association of data between data items of multidimensional data, extracts a set of data items suitable for analysis based on the above degree of association, and presents the extracted set of data items as an analysis axis recommended to the analyst during the multidimensional data analysis.

JP-A-2011-034457 describes a data mining system configured to allow a user to change granularity in attributes without trial and error. The data mining system selects attributes from data that includes a plurality of attributes and attribute values, groups attribute values of the selected attributes based on a classification hierarchy that hierarchically represents a classification corresponding to an attribute to be stored in advance, calculates a test statistic that indicates an intensity of the degree of association between the grouped attribute values and the attribute to be analyzed, determines, based on the calculated test statistic, whether the grouped attribute values are characteristic in relation to the attribute to be analyzed, re-executes, when the grouped attribute values are determined to be not characteristic, grouping based on a classification of a layer higher than a layer used in the previous grouping in the classification hierarchy.

In a site in which a large number of machines are operated, there is a strong need for accurately predicting an occurrence of a machine failure. When it is possible to predict an occurrence of an event such as a failure that occurs in a machine with high accuracy, it is possible to prevent a trouble that occurs in the machine in advance and to efficiently operate the machine. For example, in a site such as a data center or a system center, a large number of storage drives (flash module drives (FMD) or the like) amounting to tens of thousands are operated. When a failure prediction model with high accuracy can be constructed for the storage drives, it is possible to prevent an occurrence of a trouble in advance and to efficiently and stably operate a system.

However, when the above failure prediction model is constructed, it is necessary to solve the following problem. For example, in an actual operation site of a machine, when a plurality of failure modes and operation modes are present, and are various and complicated, it is necessary to execute complicated progress management for various factor analyses to search for an appropriate feature, which causes a large workload. When a frequency of the machine failure is low, it is difficult to ascertain a sign for a failure due to a difference (a case in which a frequency of use increases at the end of a month, and the like) in product types and in the operation modes, and this problem cannot be solved according to identification methods such as a decision tree, a random forest, and XGBoost in the related art. In general, a calculation formula for the feature is unclear in many cases. When search methods such as AutoML, a genetic algorithm, and reinforcement learning are used, it is necessary for a person to prepare the feature in advance.

In the specification of U.S. patent Ser. No. 10/664,698, the specification of U.S. patent Ser. No. 10/318,674, and JP-A-2012-103841, a score of the feature is calculated to search for the feature, but varieties of failure modes and operation modes are not taken into consideration. In JP-A-2011-034457, it is determined whether the grouped attribute values are characteristic in relation to the attribute to be analyzed, but it is necessary for a person to prepare the hierarchy of the group in advance.

SUMMARY

The invention is made in view of such a circumstance, and an object of the invention is to provide a prediction model construction support system and a prediction model construction support method that support construction of a prediction model for accurately predicting an event occurring in a machine.

The invention for achieving the above object relates to an information processing system (model construction support system) configured to support searching for an identification feature used to construct a prediction model that outputs an objective variable related to a predicted event for a machine based on input explanatory variables, and a division method for dividing the explanatory variables into groups to improve calculation accuracy of the objective variable based on the prediction model. The information processing system includes an information processing device including a processor and a storage element. The explanatory variables are divided into a plurality of groups, and accuracy C of the identification feature is calculated when the identification feature is set based on the explanatory variable in each of the groups. A score SF of the identification feature in each of the groups is calculated based on the accuracy C of the identification feature and a support ratio S that is a ratio of the explanatory variable in each of the groups to all of the explanatory variables before division to generate information based on the calculated score SF.

Problems, configurations, and effects other than those described above will be clarified based on the description of the following embodiment.

According to the invention, the construction of the prediction model for accurately predicting an event occurring in the machine can be supported.

BRIEF DESCRIPTION OF THE DRAWINGS

FIG. 1A is a diagram showing a case in which it is necessary to consider division of explanatory variables into groups.

FIG. 1B is a diagram showing a case in which it is necessary to consider the division of explanatory variables into groups.

FIG. 14B is a diagram showing construction of components of the process tree.

FIG. 16 is a diagram showing a list of a main operation on the process tree.

FIG. 19A is a flowchart showing details of objective variable registration processing.

FIG. 19B is an example of an objective variable.

FIG. 23A is a flowchart showing details of the group division feature (GFS) registration processing and group division processing according to a group division feature (GFS).

FIG. 24B is a flowchart showing details of processing of selecting the best child in a group in FIG. 24A.

FIG. 27B is a flowchart showing details of influence degree calculation processing in FIG. 27A.

FIG. 28A is a diagram showing an example of a case in which the time-series data is divided into groups based on a result of visually classifying the time-series data by an analyst or the like.

FIG. 30 is a diagram showing a description example of a feature.

DESCRIPTION OF THE PREFERRED EMBODIMENTS

Figure 2:
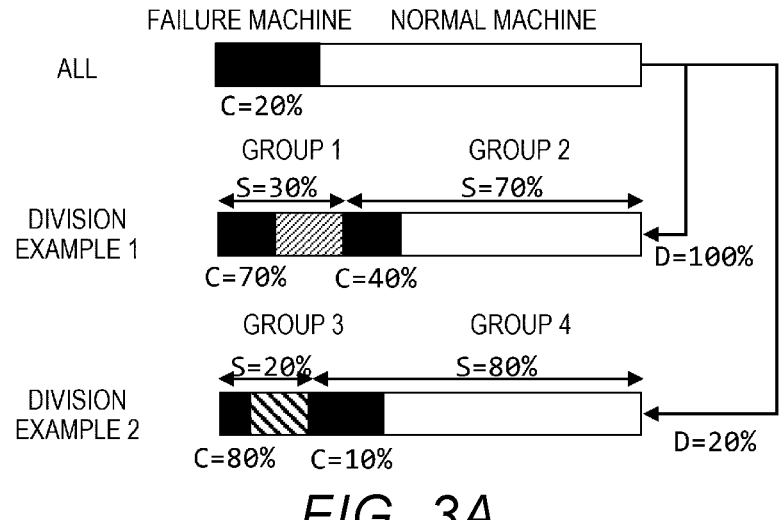
FIG. 2 is a diagram showing an example in which explanatory variables are divided into groups.

Hereinafter, an embodiment of the invention will be described in detail with reference to the drawings. The invention can be implemented in various other forms. The following description and drawings are merely examples for describing the invention, and are omitted and simplified as appropriate for clarification of the description. Each component to be described below may be singular or plural unless otherwise limited.

In the following description, although various types of information may be described in terms of expressions such as "information", "data", "list", and "table", the various types of information may be expressed by other data structures. When identification information is described, expressions such as "identifier" and "ID" are used, and the expressions can be replaced with each other.

In the following description, a letter "S" in front of reference numerals means a processing step. In the following description, the same or similar components are denoted by the same reference numerals, and a repetitive description thereof may be omitted. In the following description, for convenience of description, information having the same content may be given different reference numerals.

In the following, regarding a large number of machines operated in a site, based on explanatory variables acquired from the machines, an information processing system (hereinafter, referred to as a "model construction support system 1") that supports the construction of a model (hereinafter, referred to as a "prediction model") for predicting information (objective variable) related to an event such as a machine failure will be described. A type of the prediction model is not necessarily limited, and the prediction model may be a machine learning model such as a deep neural network (DNN) or a rule-based model.

In the following, a case will be described as an example in which the above site is a data center or a system center, the above machine operated in the site is a storage drive (for example, a flash module drive (FMD)), the above explanatory variable is time-series data acquired for the storage drive, and the above prediction model is a model that predicts a failure of the storage drive.

In the operation of the storage drive in the data center or the system center, a plurality of failure modes (memory failure, deterioration, and the like) and operation modes are present. A sign of the failure may be buried due to differences (an increased frequency of use at the end of a month and the like) in product types or operation modes. In order to solve such a problem, in addition to searching for a feature in which all explanatory variables (time-series data) of a large number of operating machines are grouped together, it may be effective to divide the explanatory variables into a plurality of groups and to search for the feature in group units. Therefore, a model construction support system 1 provides information useful for searching the feature in which all explanatory variables (time-series data) of a large number of operating machines are grouped together, and provides information related to a division method for dividing explanatory variables into a plurality of groups, which is effective in improving prediction accuracy of the objective variable (failure).

FIGS. 1A and 1B are diagrams specifically showing a case in which it is necessary to consider division of explanatory variables into groups in order to improve the prediction accuracy of a failure of the storage drive. For example, as shown in FIG. 1A, a case in which the storage drive is blocked in the site, may be due to "failure" or "strategic replacement". Here, the "strategic replacement" is, for example, a case in which "a storage drive having a deterioration degree of 95% or more is replaced even if the storage drive does not have a failure" or "at that time, a storage drive constituting the same RAID is replaced". In this case, it is expected that the prediction accuracy of the objective variable can be improved by classifying the explanatory variables in the cases of "failure" and "strategic replacement" into different groups and separately searching for a feature for each group.

As shown in FIG. 1A, causes for the "failure" of the storage drive include "write failure", "read failure", "communication failure", "no cause description", and the like. In this case, it is expected that the prediction accuracy of the objective variable can be improved by classifying the explanatory variables into groups for each cause and separately searching for the feature for each group. For example, as shown in FIG. 1B, the storage drive may have different calculation formulas (for example, data capacity calculation formulas) for a measurement value due to differences between old and new models. In this case, it is expected that the prediction accuracy of the objective variable can be improved by classifying the explanatory variables into groups for old and new models and separately searching for the feature for each group.

FIG. 2 is a diagram showing an example in which the explanatory variables are divided into groups. In this example, prediction accuracy C of the objective variable (having or not having a sign of the failure) is 20% when the explanatory variables (time-series data) of all machines (storage drives) are not divided into groups.

A division example 1 in FIG. 2 is a case in which the explanatory variables of all machines are divided into a group 1 and a group 2. Here, the division is executed using the feature (hereinafter, referred to as "group division feature") for executing the division, and accuracy D of the division based on the group division feature is 100% in this example. Due to this division, a support ratio S of the group 1 to all the explanatory variables is 30%, and the support ratio S of the group 2 to all the explanatory variables is 70%. In this example, for the group 1, the prediction accuracy C of the objective variable using the prediction model based on the feature (hereinafter, referred to as "identification feature") searched for the group is 70%, and for the group 2, the prediction accuracy C of the objective variable based on the identification feature searched for the group is 40%.

A division example 2 in FIG. 2 is a case in which the explanatory variables of all machines are divided into a group 3 and a group 4. Here, the accuracy D of the division based on the group division feature used for the division is 20%. Due to this division, the support ratio S of the group 3 to all the explanatory variables is 20%, and the support ratio S of the group 4 to all the explanatory variables is 80%. In this example, for the group 3, the prediction accuracy C of the objective variable using the prediction model based on the identification feature searched for the group is 80%, and for the group 4, the prediction accuracy C of the objective variable using the prediction model based on the identification feature searched for the group is 10%.

As described above, the model construction support system 1 provides information useful for searching the identification feature, and provides information related to a division method for dividing explanatory variables into a plurality of groups, which is effective in improving prediction accuracy of the objective variable. Therefore, an analyst, a domain expert, a service business designer, or the like who constructs the prediction model may efficiently construct the prediction model with high prediction accuracy based on the provided information.

For example, the analyst considers improving the identification feature to improve the prediction accuracy of the objective variable based on the information provided by the model construction support system 1. For example, in the example in FIG. 2, the analyst considers whether to improve the identification feature of the whole or the groups 1 to 4, to further divide the whole or the groups 1 to 4 into other groups, and to improve the identification feature used for the division.

For example, based on the information provided by the model construction support system 1, for the analyst, the domain expert takes actions such as giving awareness and a hint (such as remembering that variables have different meanings for each manufacturer) about a new identification feature, providing a new division method (obtaining a failure diagnosis result from a repair center), visually classifying charts (such as a linear or quadratic curve), and changing problem setting (such as excluding a machine replaced at the end of the life from failure machines).

For example, the service business designer can take actions such as considering requesting a design department for a root cause countermeasure for a failure mode discovered based on the information provided by the model construction support system 1 and changing an object of the prediction model (failure identification targets are concentrated only on a new model for which failures can be reliably identified, and failure identification for an old model is given up, and the like).

The model construction support system 1 supports work of constructing the prediction model by repeating trial and error of "division into groups" and "generation of the identification feature in a group unit" in order to obtain an appropriate objective variable by the analyst or the like. For this purpose, the model construction support system 1 calculates the "score" when explanatory variables are given to the prediction model constructed based on the groups and the identification feature in the group unit that are set in the process of trial and error, and calculates the "reward", which is information that serves as an index for improving the groups and the identification feature in a more appropriate direction. Then, information (hereinafter, referred to as "model construction support information") including the calculated "score" and "reward" is generated on a graph showing the group, the type of division, and the feature in a tree structure and is provided to the analyst.

In the present example, the "score" is defined as follows. First, a score SF for the identification feature is defined by the following formula.

$$SF = S * C \qquad \text{Formula 1}$$

In the above formula, a support ratio (S) is made for a high-level group of a certain group, and confidence (C) is accuracy (for example, F-measure in machine learning) of an identification feature (F).

A score SG, which is a score in a group G, is defined as follows.

$$SG = \max(\{SF \text{ in } G\}, \{SD * D \text{ in } G\}) \qquad \text{Formula 2}$$

The above SD is a score SD for a group division method, and is defined as follows. Here, D is accuracy of the group division feature.

$$SD = \text{sum}(\{SG \text{ in } D\}) \qquad \text{Formula 3}$$

In the present embodiment, the "reward" is defined by the following formula.

$$\text{Reward} = \text{influence degree} * \text{probability of success} \qquad \text{Formula 4}$$

In the above formula, the influence degree (degree of effect of improvement in scores of all groups due to improvement in scores of separate groups) is a value (=difference in scores of all groups/difference in scores of separate group) obtained by dividing a difference (difference due to improvement) in the scores of all the groups by the difference in the scores of a separate group. The probability of success is a probability that a good feature can be found, for example, is acquired based on the number of features searched (registered) so far (when the number of trial and error is large, the probability of success becomes low with enough consideration), the quantity (coverage rate) of measurement values used in challenges so far (when the quantity is large, the range that has already been verified is large and the probability of success is low), or the like.

Figure 3A:
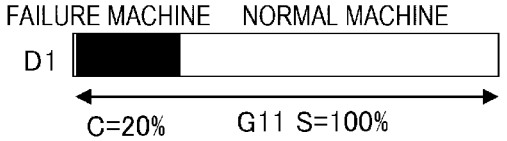
FIG. 3A is a diagram showing a score calculation example.
Figure 3B:
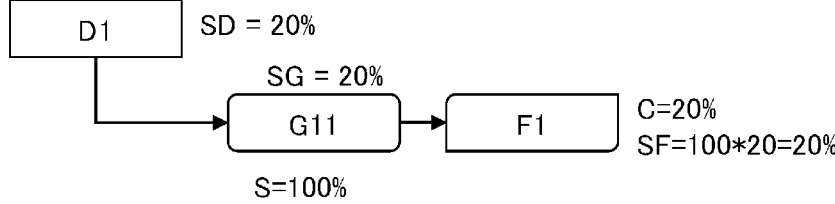
FIG. 3B is a diagram showing a score calculation example.
Figure 3C:
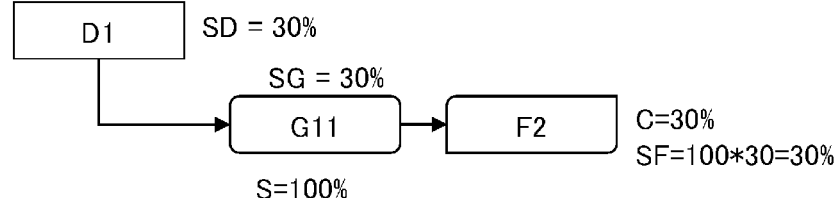
FIG. 3C is a diagram showing a score calculation example.

FIGS. 3A to 3C show score calculation examples. FIG. 3A is a band graph showing a ratio of the failure machine and a normal machine, and FIGS. 3B and 3C are tree structure graphs showing the score calculation examples for the band graph in FIG. 3A. As shown in FIG. 3A, this example is a case in which the explanatory variables (time-series data) are not divided into groups. FIG. 3B shows a case in which an identification feature F1 is searched such that the prediction accuracy of the objective variable is 20%. The score SF of the identification feature F1 is 20%, the score SG in the group is 20%, and the score SD for the division method is 20%. FIG. 3C shows a case in which an identification feature F2 is found such that the prediction accuracy of the objective variable is 30%. The score SF of the identification feature F2 is 30%, the score SG in the group is 30%, and the score SD for the division method is 30%.

Figure 4A:
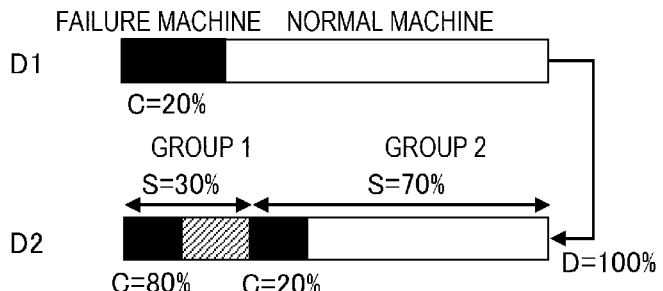
FIG. 4A is a diagram showing another score calculation example.
Figure 4B:
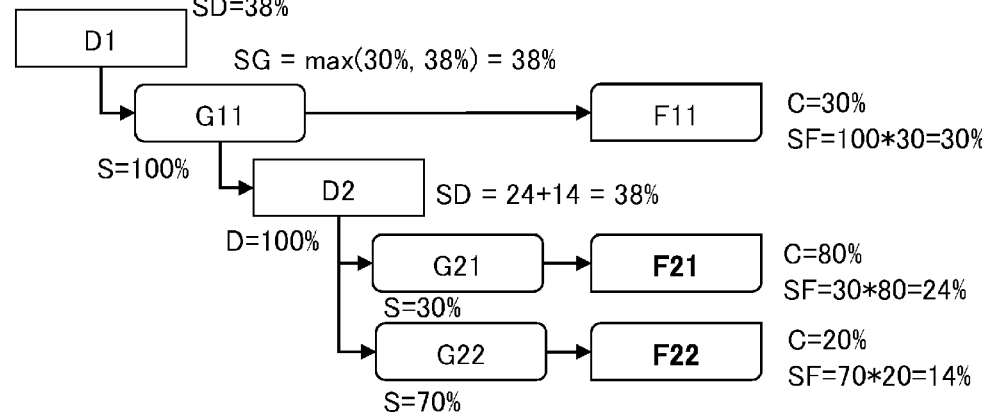
FIG. 4B is a diagram showing another score calculation example.

FIGS. 4A and 4B show other score calculation examples. FIG. 4A is a band graph showing a ratio of the failure machine and the normal machine, and FIG. 4B is a tree structure graph showing a score calculation example for the band graph in FIG. 4A. As shown in FIG. 4A, this example is a case in which the explanatory variables (time-series data) are subjected to division D2 and are divided into two groups (the group 1 and the group 2) at a ratio of 30% and 70%. As shown in FIG. 4B, for example, scores of identification features F21 and F22 of groups are 80% and 20%, the score SG in the group is 24% for the group 1 and 14% for the group 2, the score SD of the division D2 is 38%, and the score SG of a group Gil is 38%.

Figure 5A:
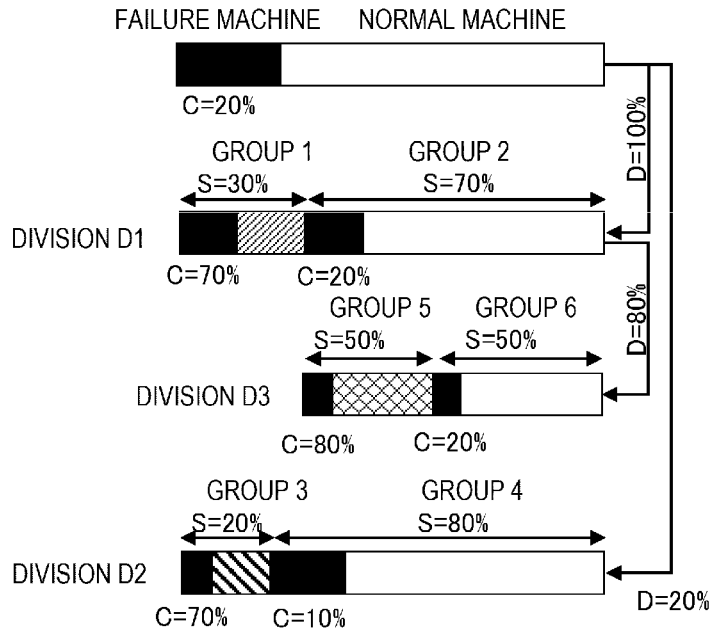
FIG. 5A is a diagram showing another score calculation example.
Figure 5B:
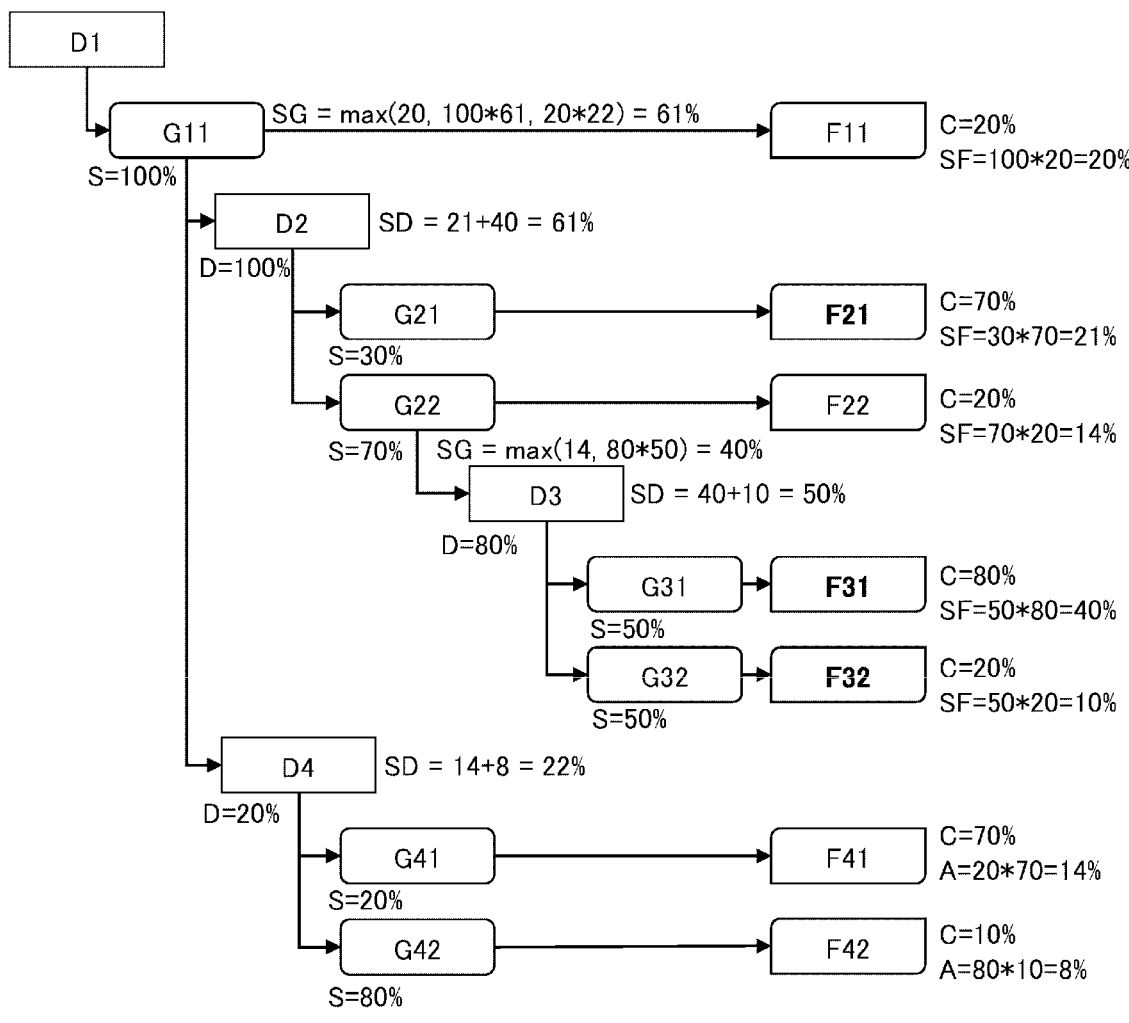
FIG. 5B is a diagram showing another score calculation example.

FIGS. 5A and 5B show other score calculation examples. FIG. 5A is a band graph showing a ratio of the failure machine and the normal machine, and FIG. 5B is a tree structure graph showing a score calculation example for the band graph in FIG. 5A. As shown in FIG. 5A, this example is a case in which division D3 is further executed on the explanatory variables (time-series data) for the division D1 (the group 1 and the group 2) shown in FIG. 4A, and the time-series data of the group 2 of the division D1 is further divided into two groups (a group 5 and a group 6) at a ratio of 50% and 50%. In this example, the score SD of the division D3 is 50%, the score SD of the division D2 is 61%, and the score SG of the group Gil is 61%. In this example, it can be found that, when the accuracy D (currently 20%) of the group division feature of division D4 is improved, all the score SD for the division method increases, so that the influence degree increases and the reward increases.

Figure 6:
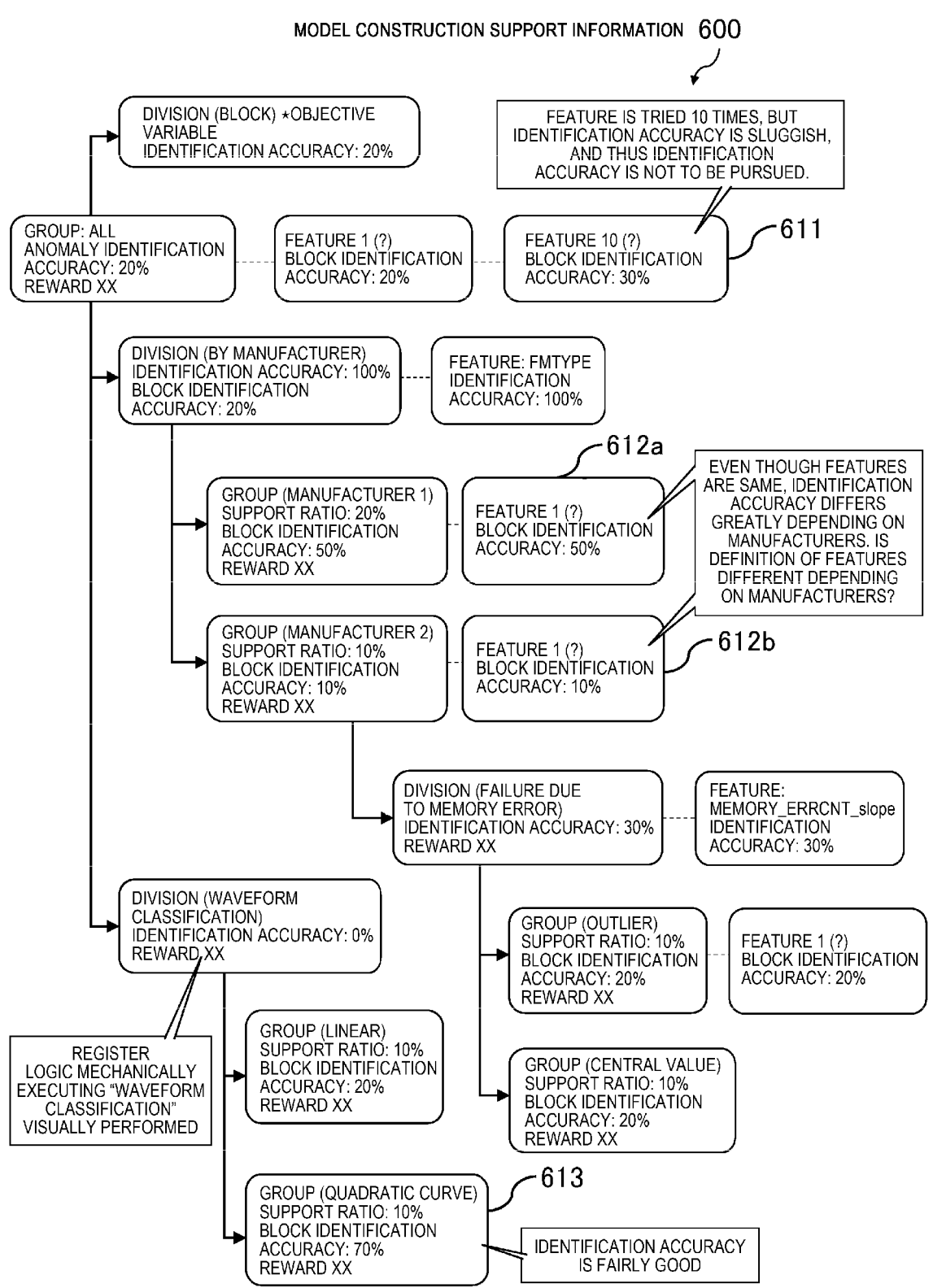
FIG. 6 is an example of model construction support information.

FIG. 6 is an example of model construction support information 600 described above. As shown in FIG. 6, the model construction support information 600 is a tree structure graph that hierarchically represents the relation between groups. Nodes constituting the graph include nodes representing groups, nodes representing division, nodes representing the groups belonging to the division, nodes representing the features adopted in the groups, and the like. Among these nodes, the node representing an entire group displays the identification accuracy of the objective variable and the reward of the entire group. The nodes representing the division display reference (blockage, by manufacturer, failure due to memory error, and the like) of the division, the division accuracy of the feature used for the division, the identification accuracy of the objective variable for the division, and the like. The nodes representing the group display a support ratio of the explanatory variable (time-series data) of the group of a division source (high level), the identification accuracy of the objective variable based on the group, and the reward. The nodes representing the features adopted in the groups display the content of the feature, the identification accuracy of the objective variable of the feature, and the like.

In the shown model construction support information, it can be found that, for example, as for a node group indicated by a reference numeral 611, a plurality of features are tested in a group without division, and the improvement of the identification accuracy is sluggish. Therefore, the analyst can obtain, for example, a suggestion that the feature is not to be searched in the group without division any more.

For example, it can be found that, when a node indicated by a reference numeral 612*a* is compared with a node indicated by a reference numeral 612*b*, even though the feature is the same, different manufacturers have a great influence on the identification accuracy. Therefore, for example, the analyst can know that the definition of the feature may differ depending on the manufacturer, and can obtain a suggestion that dividing the group by manufacturer may be effective in improving the identification accuracy of the objective variable.

For example, in a node indicated by a reference numeral 613, the identification accuracy of the objective variable is improved. Therefore, the analyst can obtain a suggestion that the identification accuracy of the objective variable may be improved by division with a waveform, for example. The analyst can obtain, for example, a suggestion that it may be possible to efficiently improve the identification accuracy by applying software (logic) mechanically classifying waveforms.

The tree-structured graphs shown in FIGS. 3B, 3C, 4B, 5B, and the like may be presented (displayed) to the analyst or the like as the model construction support information 600. With reference to these graphs, the analyst or the like can easily visually check the accuracy C, the support ratio S, the score SF, the score SG, the score SD, and the like of the identification feature, and can efficiently search for the identification feature and the group division method.

Next, a specific configuration of the model construction support system 1 will be described in detail.

Figure 7A:
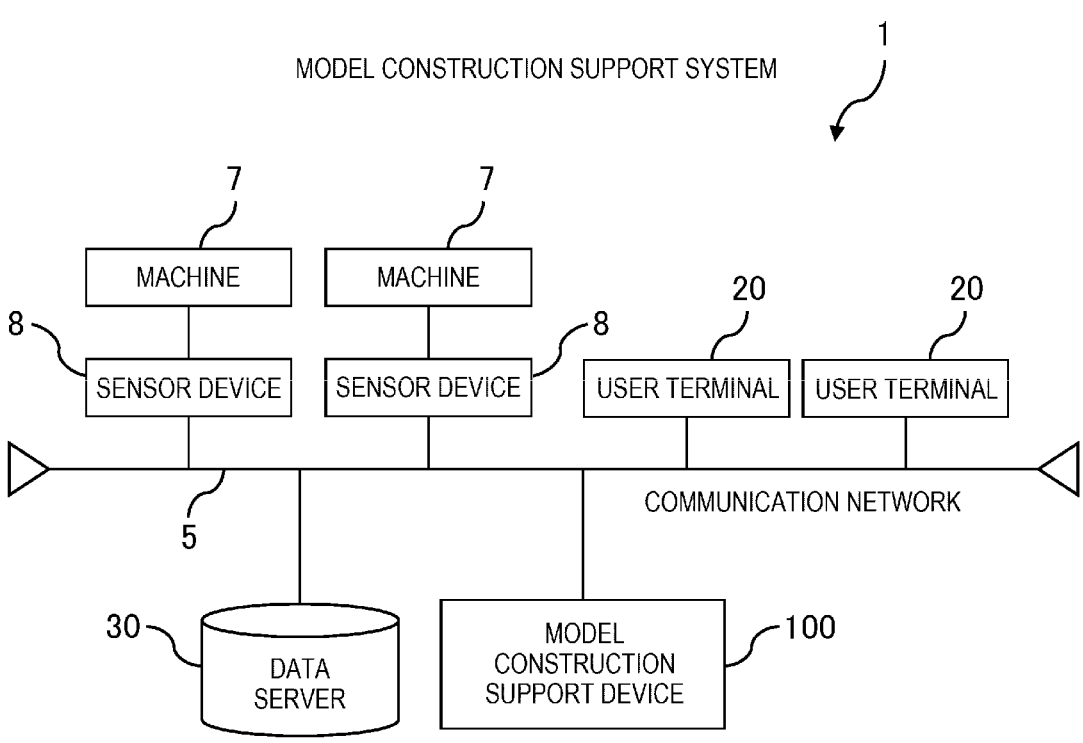
FIG. 7A is an example of a system configuration diagram of a model construction support system.

FIG. 7A is a system configuration diagram of the model construction support system 1. As shown in FIG. 7A, the model construction support system 1 includes a large number of machines 7, sensor devices 8, user terminals 20, a data server 30, and a model construction support device 100. These devices are communicably connected to one another via a communication network 5. The communication network 5 is, for example, a communication infrastructure that implements wireless or wired communication, and is, for example, a local area network (LAN), a wide area network (WAN), the Internet, a dedicated line, various public communication networks, and the like.

The machines 7 are the large number of machines operated in the site, and is the storage drive (flash module drive (FMD)) and a flash memory drive (a solid state drive (SSD), a hard disk drive (HDD), and the like) in this example.

The sensor device 8 includes a communication module and various sensors, measures information (temperature, rotation speed, data read speed, data write speed, input/output per second (IOPS), response time, throughput, latency, remaining capacity, and the like) about the machine 7 by the various sensors, generates time-series data based on measured values, and transmits the generated time-series data to the data server 30. Various sensors include a sensor that is implemented by hardware such as a temperature sensor, and a sensor that is implemented by software such as a program for measuring a data reading speed and a writing speed.

The user terminal 20 is an information processing device (computer), is communicably connected to the sensor device 8, the data server 30, and the model construction support device 100, and executes setting of various types of information, acquiring of the provided information, presenting to the user, monitoring, and controlling for these devices.

The data server 30 includes the information processing device, and manages (stores) various types of data such as time-series data sent from the sensor device 8.

The model construction support device 100 includes the information processing device, analyzes the time-series data stored in the data server 30, extracts the feature, constructs a prediction model, and provides information for supporting the construction of the prediction model.

Figure 7B:
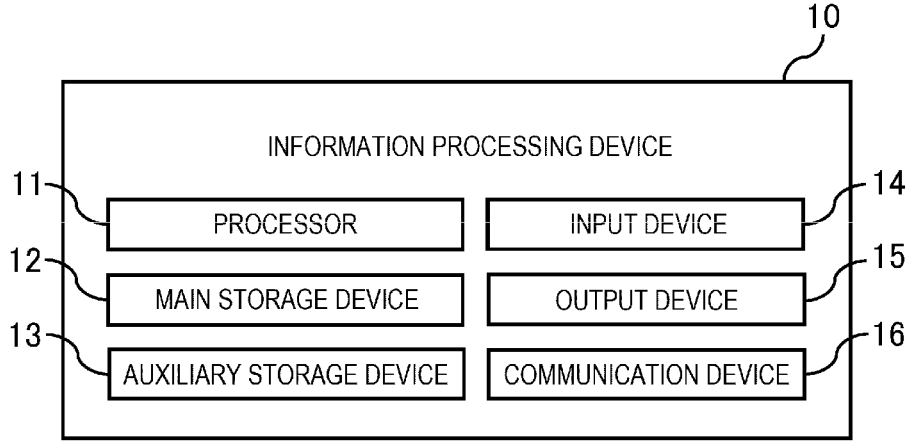
FIG. 7B is an example of an information processing device used to constitute the model construction support system.

FIG. 7B shows an example of a hardware configuration of the information processing device used to implement the user terminal 20, the data server 30, and the model construction support device 100.

The shown information processing device 10 includes a processor 11, a main storage device 12, an auxiliary storage device 13, an input device 14, an output device 15, and a communication device 16. The information processing device 10 is, for example, a personal computer, a smartphone, a tablet, an office computer, a general-purpose machine, or the like. The user terminal 20, the data server 30, and the model construction support device 100 are implemented using, for example, a plurality of information processing devices 10 that are communicably connected to one another.

All or a part of the information processing device 10 may be implemented using, for example, a virtual information processing resource provided using a virtualization technique, a process space division technique, or the like. The virtual information processing resource is a virtual server provided by a cloud system or the like. All or a part of functions provided by the information processing device 10 may be implemented by, for example, a service provided by the cloud system via an application programming interface (API).

All or a part of functions provided by the information processing device 10 may be implemented using, for example, Software as a Service (SaaS), Platform as a Service (PaaS), and Infrastructure as a Service (IaaS).

The processor 11 shown in FIG. 7B includes, for example, a central processing unit (CPU), a micro processing unit (MPU), a graphics processing unit (GPU), a field programmable gate array (FPGA), an application specific integrated circuit (ASIC), and an artificial intelligence (AI) chip.

The main storage device 12 is a device that stores programs and data, and includes, for example, a storage element such as a read only memory (ROM), a random access memory (RAM), or a non volatile memory (Non Volatile RAM (NVRAM)).

The auxiliary storage device 13 is, for example, a read and write device of a recording medium such as a solid state drive (SSD), a hard disc drive, an optical storage device (such as a compact disc (CD) and a digital versatile disc (DVD)), a storage system, an IC card, an SD card, or an optical recording medium, and a storage domain of the cloud server. The programs and data can be read into the auxiliary storage device 13 via a read device of the recording medium or the communication device 16. The programs and the data that are memorized (stored) in the auxiliary storage device 13 are read into the main storage device 12 at any time.

All or a part of the programs and data that implement the functions of the information processing device 10 may be memorized in the main storage device 12 or the auxiliary storage device 13 in advance, and if necessary, may be read into the main storage device 12 or the auxiliary storage device 13 via the read device of the recording medium or the communication device from a non-temporary storage device provided in a non-temporary recording medium or another device.

The input device 14 is an interface that receives input from the outside, and is, for example, a keyboard, a mouse, a touch panel, a card reader, a pen input type tablet, a voice input device, or the like.

The output device 15 is an interface that outputs various types of information such as a processing process or a processing result. The output device 15 is, for example, a display device (such as a liquid crystal monitor, a liquid crystal display (LCD), and a graphic card) that visualizes the various types of information, a device (such as a sound output device (a speaker)) that vocalizes the various types of information, and a device (such as a printing device) that converts the various types of information into characters. For example, the information processing device 10 may input information to other devices or receive information from other devices via the communication device 16.

The input device 14 and the output device 15 form a user interface that implements interactive processing (information input reception, information presentation, and the like) with the user (user and manager).

The communication device 16 is a device that implements communication with other devices. The communication device 16 is a wired or wireless communication interface that implements communication with other devices via the communication network 5, and is, for example, a network interface card (NIC), a wireless communication module, or a USB module.

For example, an operating system, a file system, a database management system (DBMS) (relational database, NoSQL, and the like), a key-value store (KVS), and the like may be introduced to the information processing device 10.

Various functions provided in the user terminal 20, the data server 30, and the model construction support device 100 are implemented by the processor 11 provided in the user terminal 20, the data server 30, and the model construction support device 100 reading and executing programs stored in the main storage device 12, or by hardware (such as an FPGA, an ASIC, or an AI chip) constituting the user terminal 20, the data server 30, or the model construction support device 100.

The user terminal 20, the data server 30, and the model construction support device 100 store various types of information (data) as, for example, a table in a database or a file managed by the file system.

Figure 8:
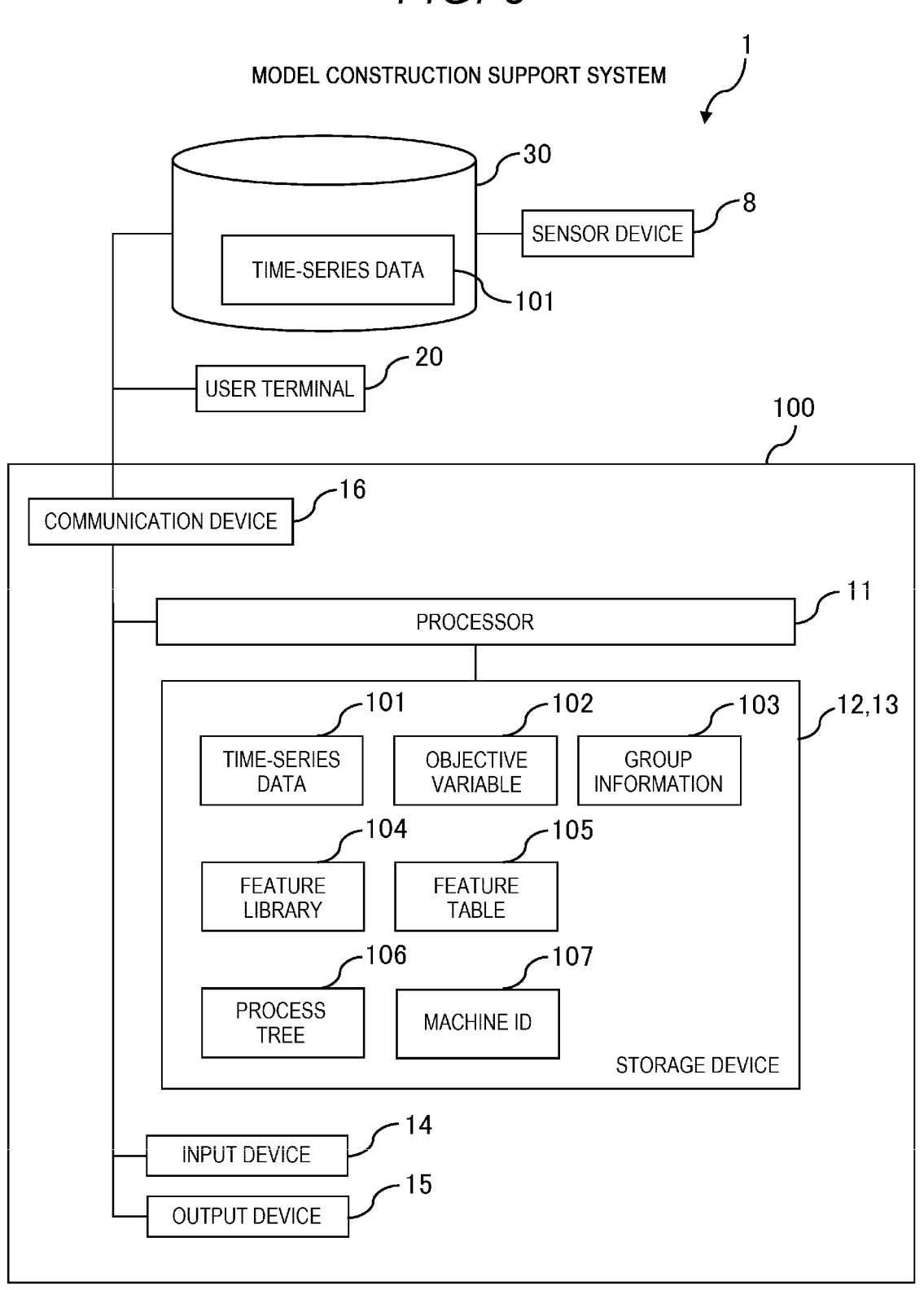
FIG. 8 is a diagram showing main information treated by the model construction support system.

FIG. 8 is a diagram showing main information (data) treated by the model construction support system 1.

As shown in FIG. 8, the data server 30 manages (stores) time-series data 101 received from the sensor device 8.

The model construction support device 100 stores the time-series data 101, an objective variable 102, group information 103, a feature library 104, a feature table 105, a process tree 106, and a machine ID 107.

Figure 9:
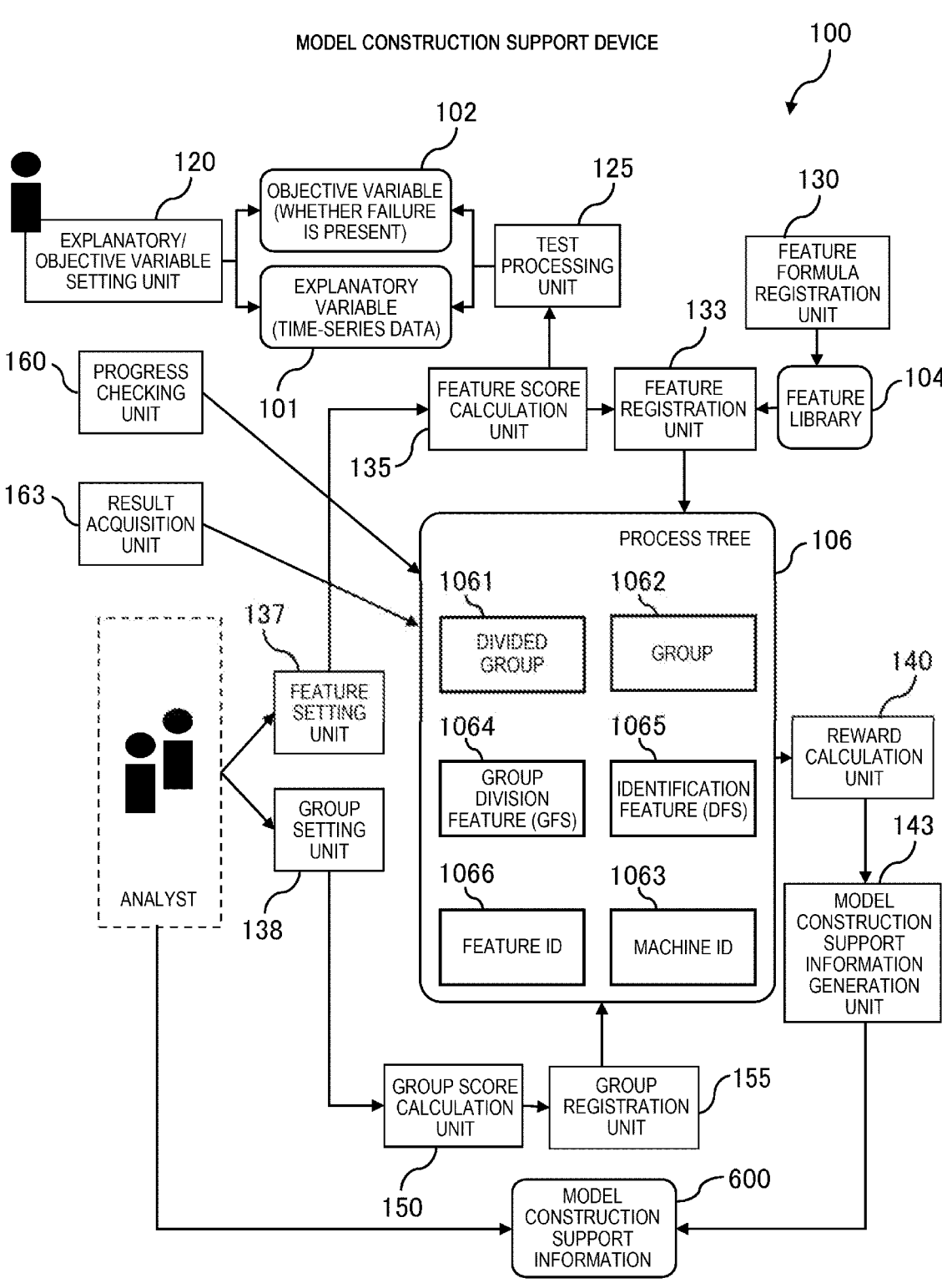
FIG. 9 is a diagram showing main functions of the model construction support system.

FIG. 9 is a block diagram showing main functions of the model construction support system 1. As shown in FIG. 9, the model construction support system 1 has functions of an explanatory/objective variable setting unit 120, a test processing unit 125, a feature formula registration unit 130, a feature registration unit 133, a feature score calculation unit 135, a feature setting unit 137, a group setting unit 138, a reward calculation unit 140, a model construction support information generation unit 143, a group score calculation unit 150, a group registration unit 155, a progress checking unit 160, and a result acquisition unit 163.

Among the above functions, the explanatory/objective variable setting unit 120 executes processing related to acquisition (reception) and setting (registration, editing, deletion, and the like) on the time-series data 101 and the objective variable 102.

The test processing unit 125 executes processing related to a test (calculation of the identification accuracy of the objective variable, and the like) for the prediction model.

The feature formula registration unit 130 executes processing (providing the user interface for setting, and the like) related to the setting (registration, editing, deletion, and the like) of the feature library 104.

The feature registration unit 133 executes processing related to registration of information about the feature in the process tree 106.

The feature score calculation unit 135 executes processing related to the calculation of the score of the feature (identification feature and group division feature).

The feature setting unit 137 executes processing (providing the user interface for setting, and the like) related to the setting (registration, editing, deletion, and the like) of the feature.

The group setting unit 138 executes processing (providing the user interface for setting, and the like) related to setting (registration, editing, deletion, and the like) of the group information 103, which is information about the group.

The reward calculation unit 140 executes processing related to calculation of the reward.

The model construction support information generation unit 143 executes processing related to generation and presentation (display) of the model construction support information 600.

The group score calculation unit 150 executes processing related to the calculation of a group score.

The group registration unit 155 executes processing related to registration of information about the group in the process tree 106.

Figures 10, 11A:
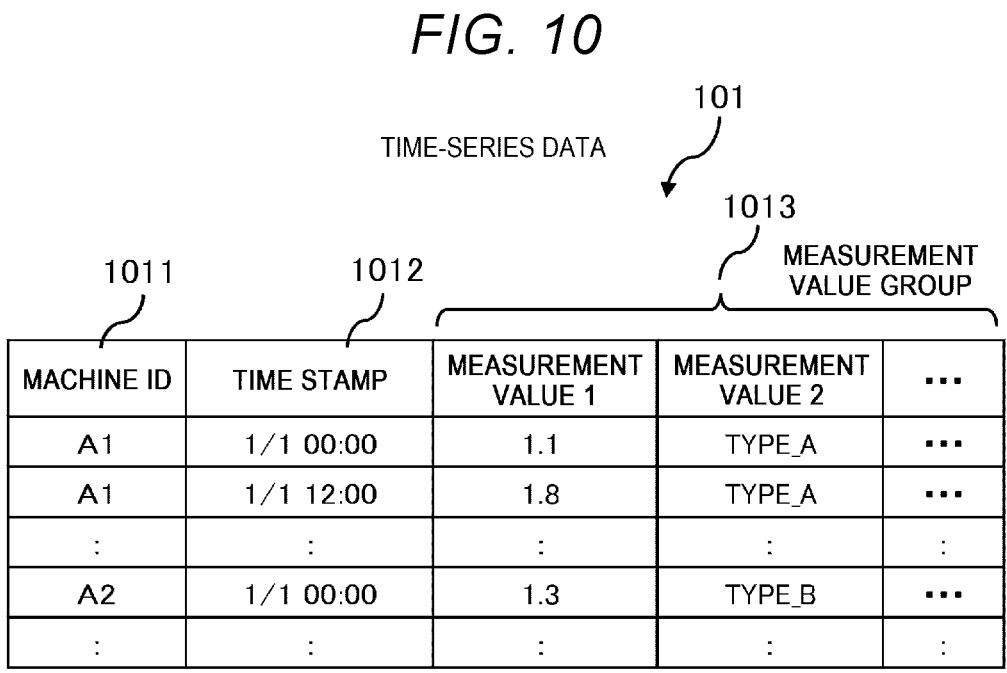
FIG. 10 is an example of time-series data.
FIG. 11A is an example of group information.

FIG. 10 shows an example of time-series data 101. As shown in FIG. 10, the shown time-series data 101 includes a plurality of records having items of a machine ID 1011, a time stamp 1012, and a measurement value group 1013. One of records of the time-series data 101 corresponds to a measurement value measured by the sensor device 8 at a certain time point (time stamp) for a certain machine 7.

Among the above items, the device ID, which is an identifier of the machine 7, is stored in the machine ID 1011. Information indicating date and time when the measurement value is acquired is stored in the time stamp 1012. One or more types of measurement values are stored in the measurement value group 1013.

Figure 11B:
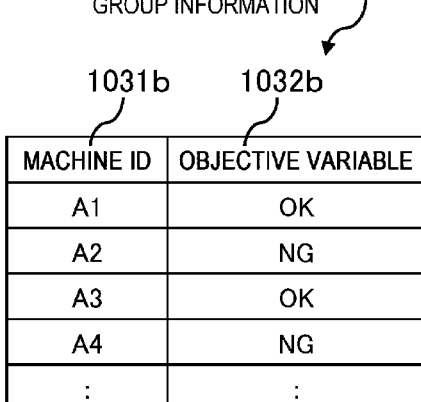
FIG. 11B is an example of the group information.
Figure 11C:
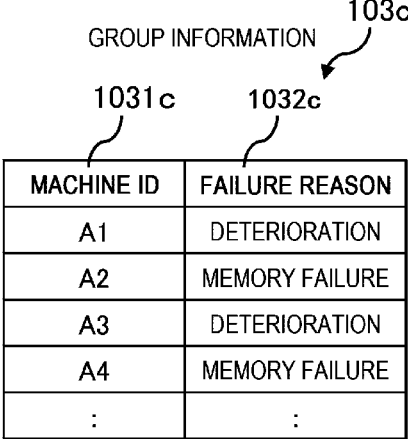
FIG. 11C is an example of the group information.

FIGS. 11A to 11C show an example of the group information 103. In the group information 103, information about groups is managed. In the group information 103a shown in FIG. 11A, correspondence between the machine 7 (machine ID 1031a) and a group to which the machine belongs (GroupSet 1032a) is managed. In the group information 103b shown in FIG. 11B, an objective variable 1032b of each machine (machine ID 1031b) is managed. In the group information 103c shown in FIG. 11C, a failure reason 1032c for each machine (machine ID 1031c) is managed.

Figure 12:
FIG. 12 is an example of a feature library.

FIG. 12 shows an example of the feature library 104. In the feature library 104, information about feature is managed. As shown in FIG. 12, the shown feature library 104 includes one or more records having items of logic 1041, dimension 1042, and a lambda expression 1043. One record of the feature library 104 corresponds to one feature (identification feature and group division feature). Among the above items, information indicating a type of logic of the feature is stored in the logic 1041. Dimension of the feature is stored in the dimension 1042. Information expressing the feature by a lambda expression is stored in the lambda expression 1043.

Figure 13:
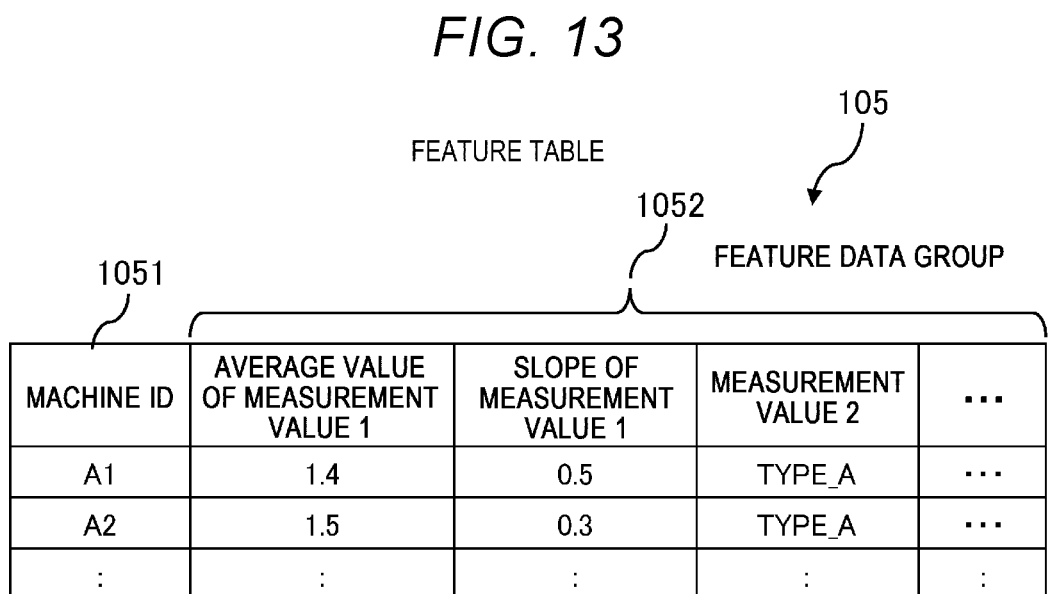
FIG. 13 is an example of a feature table.

FIG. 13 shows an example of the feature table 105. Information about a result of calculating the feature based on the time-series data is stored in the feature table 105. As shown in FIG. 13, the feature table 105 includes items of a machine ID 1051 and a feature data group 1052. Among the above items, the machine ID described above is stored in the machine ID 1051. A value of one or more types of features is stored in the feature data group 1052.

Figure 14A:
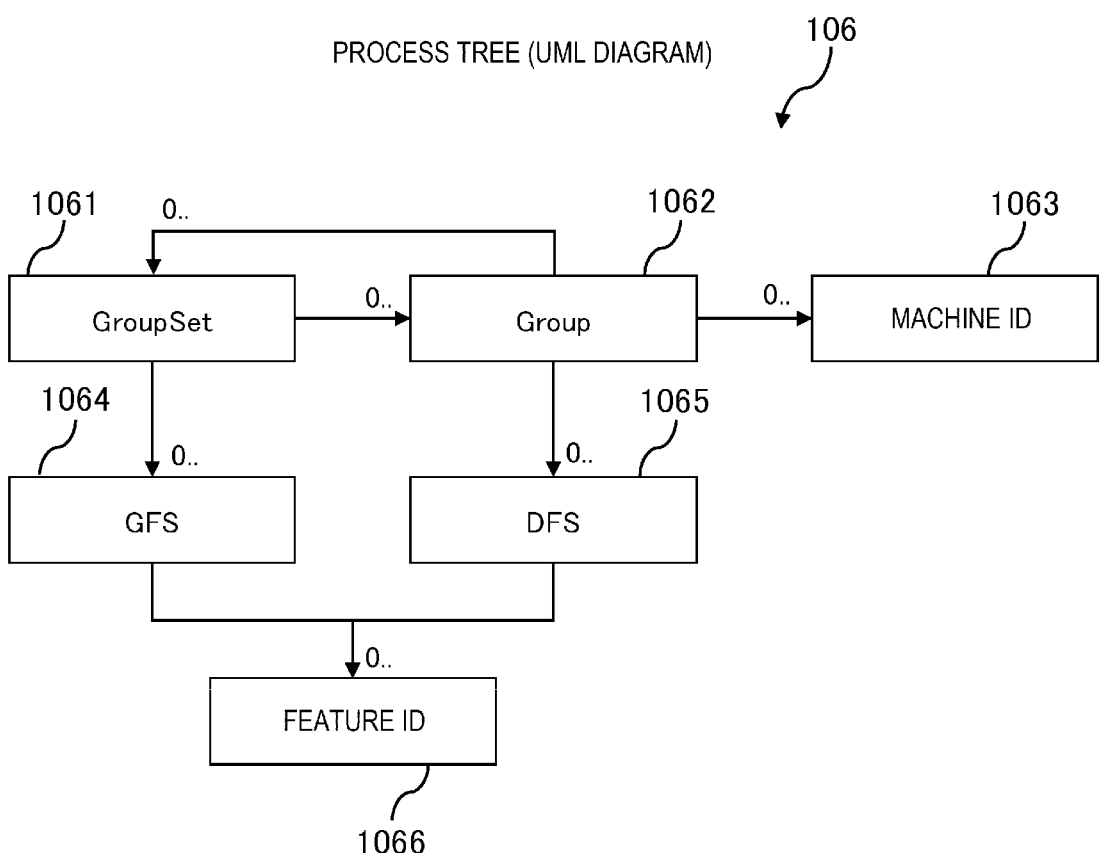
FIG. 14A is a UML diagram showing an example of a process tree.

FIG. 14A is a unified modeling language (UML) diagram showing a structure of the process tree 106, and FIG. 14B is a diagram showing attribute of components of the process tree. As shown in FIGS. 14A and 14B, the process tree 106 has a structure in which the GroupSet 1061, a Group 1062, a group division feature (GFS) 1064, and an identification feature (DFS) 1065 are associated with a machine ID 1063 and a feature ID 1066. The Group 1062 is a variable representing a group.

Figure 15:
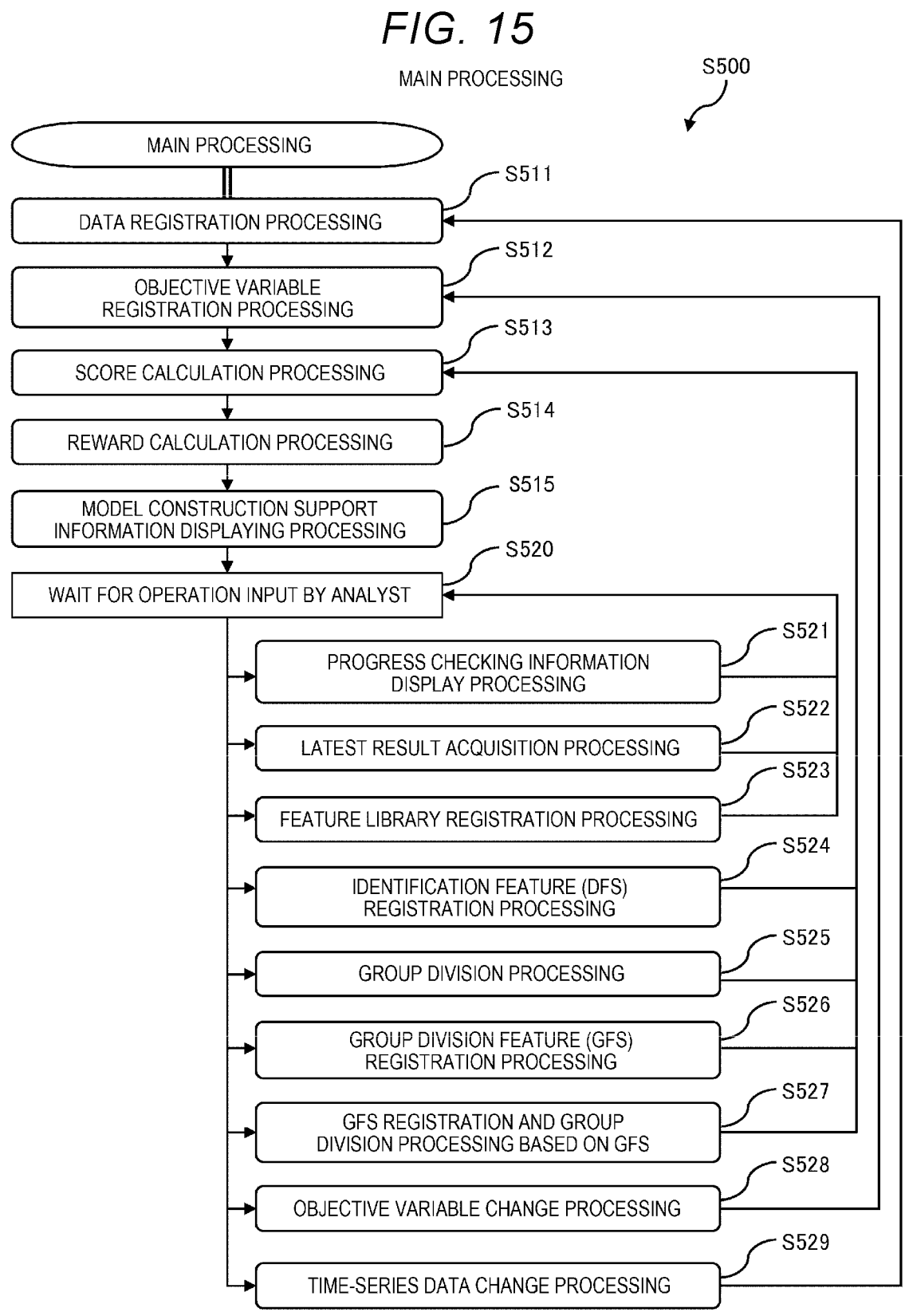
FIG. 15 is a flowchart showing main processing.
Figures 17A, 17B, 17C, 17D, 17E, 17F, 17G, 17H:
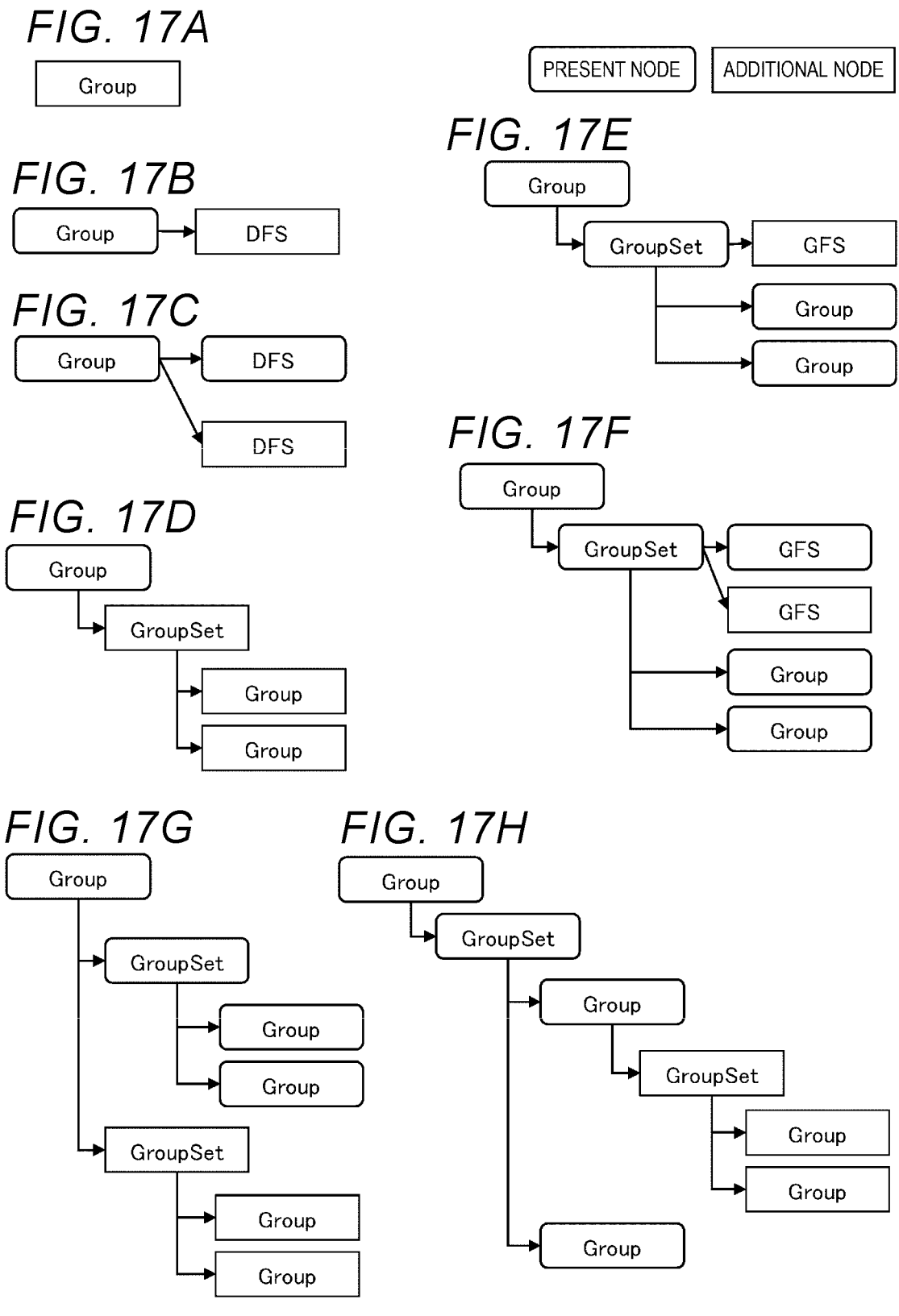
FIGS. 17A to 17H illustrate diagrams showing a change of the process tree for (a) to (e) operations (processing).

FIG. 15 is a flowchart showing main processing (hereinafter, referred to as "main processing S500") executed by the model construction support device 100. Hereinafter, the main processing S500 will be described with reference to FIG. 15.

First, the explanatory/objective variable setting unit 120 executes processing (data registration processing S511 and objective variable registration processing S512) for setting the time-series data 101 and the objective variable 102.

Next, the feature score calculation unit 135 executes processing (score calculation processing S513) of calculating a feature score and inputting the calculated value to the feature registration unit 133 and the test processing unit 125.

Next, the reward calculation unit 140 executes processing (reward calculation processing S514) of calculating a reward based on the process tree 106.

Next, the model construction support information generation unit 143 executes processing (model construction support information displaying processing S515) of displaying the model construction support information based on the calculated reward and presenting (displaying) the model construction support information to the analyst.

Next, the model construction support device 100 waits for an operation input by the analyst (S520).

Here, for example, when the analyst executes a progress checking information display operation, the progress checking unit 160 executes processing (progress checking information display processing S521) of generating and displaying a screen on which the progress checking information 3100 is described. Thereafter, the processing returns to S520.

For example, when the analyst executes a latest result display operation, the result acquisition unit 163 executes processing (latest result acquisition processing S522) of generating and displaying the latest result display screen. Thereafter, the processing returns to S520.

For example, when the analyst executes a feature library registration operation, the feature registration unit 133 executes processing (feature library registration processing S523) of displaying the feature library registration screen and receiving the feature library registration from the analyst. Thereafter, the processing returns to S520.

For example, when the analyst executes an identification feature (DFS) registration operation, the feature registration unit 133 executes processing (identification feature (DFS) registration processing S524) of displaying the identification feature (DFS) registration screen and receiving the identification feature (DFS) registration from the analyst. Thereafter, the processing returns to S513.

For example, when the analyst executes an operation for dividing the time-series data into groups, the group registration unit 155 executes processing (group division processing S525) of displaying the group division registration screen and receiving the group division registration from the analyst. Thereafter, the processing returns to S513.

For example, when the analyst executes an operation for registering the group division feature (GFS), the feature registration unit 133 executes processing (group division feature (GFS) registration processing S526) of displaying the group division feature (GFS) registration screen and receiving the group division feature (GFS) registration from the analyst. Thereafter, the processing returns to S513.

For example, when the analyst performs the operation of registering the group division feature (GFS) and the group division, the feature registration unit 133 executes processing of displaying the group division feature (GFS) registration screen and receiving the group division feature (GFS) registration from the analyst, and the group registration unit 155 executes processing of dividing the process tree 106 into groups based on the group division feature (GFS) (GFS registration and group division processing S527 based on the GFS). Thereafter, the processing returns to S512.

For example, when the analyst executes an operation of changing the objective variable 102, the explanatory/objective variable setting unit 120 executes processing (objective variable change processing S528) of displaying a screen for changing the objective variable 102 and receiving the change of the objective variable 102. Thereafter, the processing returns to S511.

For example, when the analyst executes an operation of changing the time-series data 101, the explanatory/objective variable setting unit 120 executes processing (time-series data change processing S529) of displaying a screen for changing the time-series data 101 and receiving the change of the time-series data 101. Thereafter, the processing returns to S511.

FIG. 16 is a list of operations (processing) on the process tree 106 executed in the main processing S500 shown in FIG. 15, and FIGS. 17A to 17H are specific examples of changes in the process tree. In FIG. 16, a reference numeral 1611 indicates a reference numeral in the main processing S500. An operation content 1612 is a content of an operation on the process tree 106 corresponding to the reference numeral 1611. An example 1613 of the change in the process tree is the number (at least one of FIGS. 17A to 17H) of diagrams showing the change in the process tree for the operation.

Figure 18:
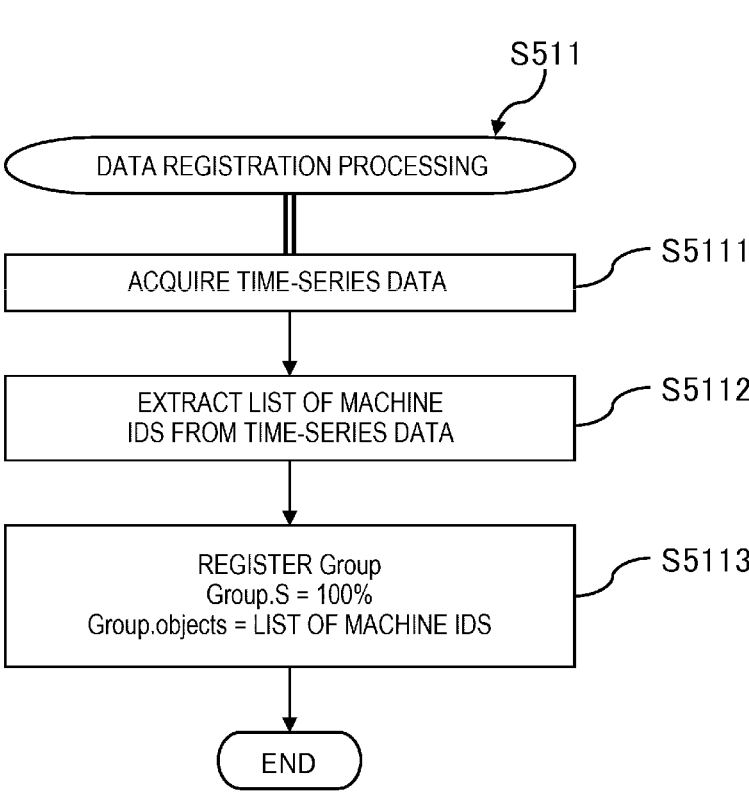
FIG. 18 is a flowchart showing details of data registration processing.

FIG. 18 is a flowchart showing details of the data registration processing S511 shown in FIG. 15. Hereinafter, the data registration processing S511 will be described with reference to FIG. 18.

First, the explanatory/objective variable setting unit 120 acquires the time-series data to be used as an explanatory variable from the data server 30, and stores the acquired time-series data as the time-series data 101 (S5111).

Next, the explanatory/objective variable setting unit 120 extracts a list of machine IDs from the time-series data 101 (S5112).

Next, the explanatory/objective variable setting unit 120 registers a variable (group), sets a value (100%) to the variable (Group.S) of the group score, and sets a machine ID acquired in S5112 to the variable (Group.objects) of the device ID belonging to the group (S5113).

FIG. 19A is a flowchart showing details of the objective variable registration processing S512 shown in FIG. 15. Hereinafter, the objective variable registration processing S512 will be described with reference to FIG. 19A.

First, the explanatory/objective variable setting unit 120 acquires the objective variable 102 (S5121). FIG. 19B shows an example of the objective variable 102.

Next, the explanatory/objective variable setting unit 120 adds a variable (GroupSet) to a variable (Group). The explanatory/objective variable setting unit sets a column name (Objective column name) of the objective variable as the variable (ID), and sets an accuracy C (Confidence) of the identification feature to 100% (S5122).

Next, the explanatory/objective variable setting unit 120 sets a value (GroupSet.ID) as the variable (ObjectiveSetID) (S5123).

Next, the explanatory/objective variable setting unit 120 lists a type X in the Objective column (S5124).

In the following S5125 and S5126, for all types X, the explanatory/objective variable setting unit 120 registers the variable (Group) under the variable (GroupSet), sets the types X as a variable (Group.ID), sets the number of machine IDs of the types X as the variable (Group.S), and sets a set of the machine IDs as the variable (Group.objects).

Figure 19C:
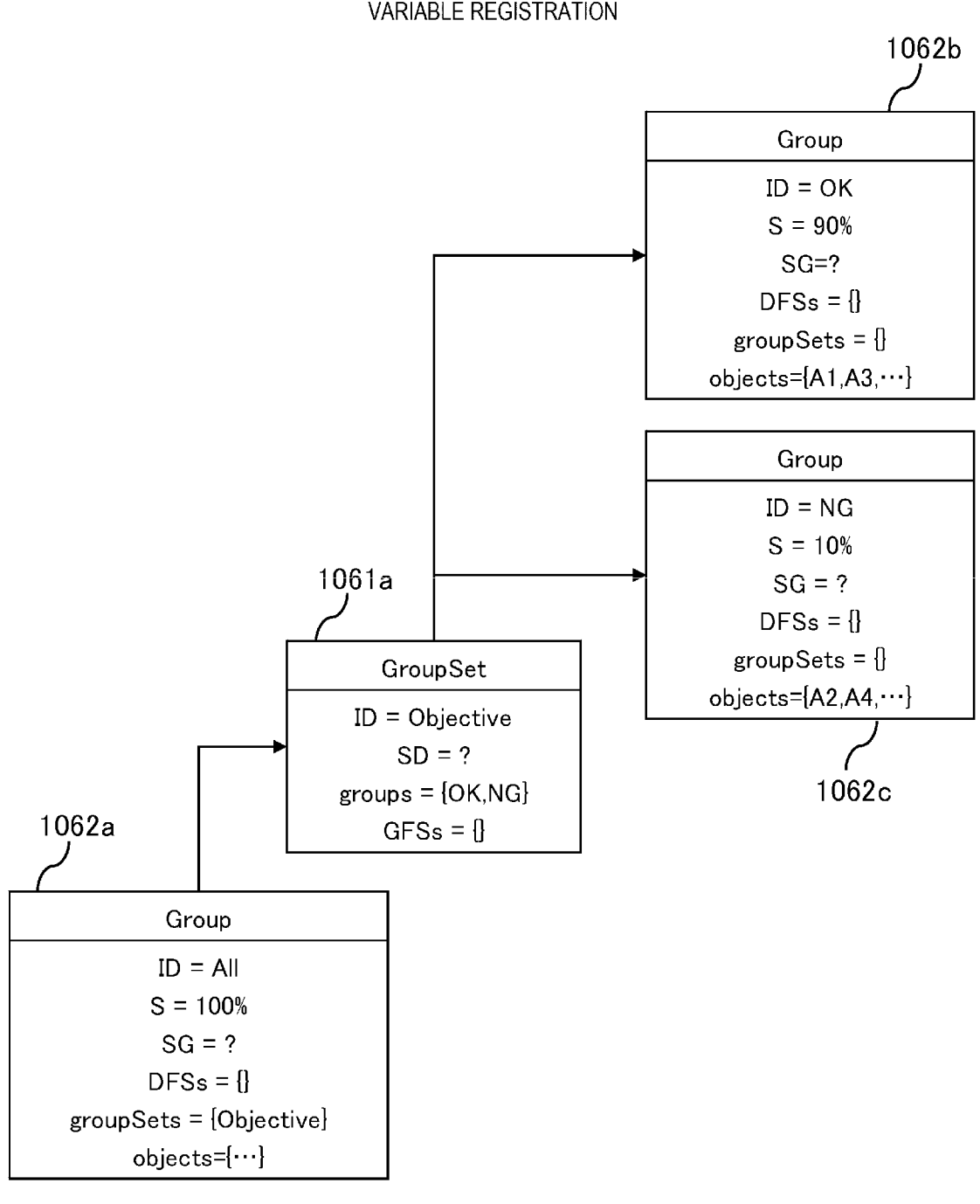
FIG. 19C is a diagram showing a structure of the process tree after the objective variable is registered.

FIG. 19C shows an example of a structure of the process tree after the execution of the objective variable registration processing S512.

Figure 20:
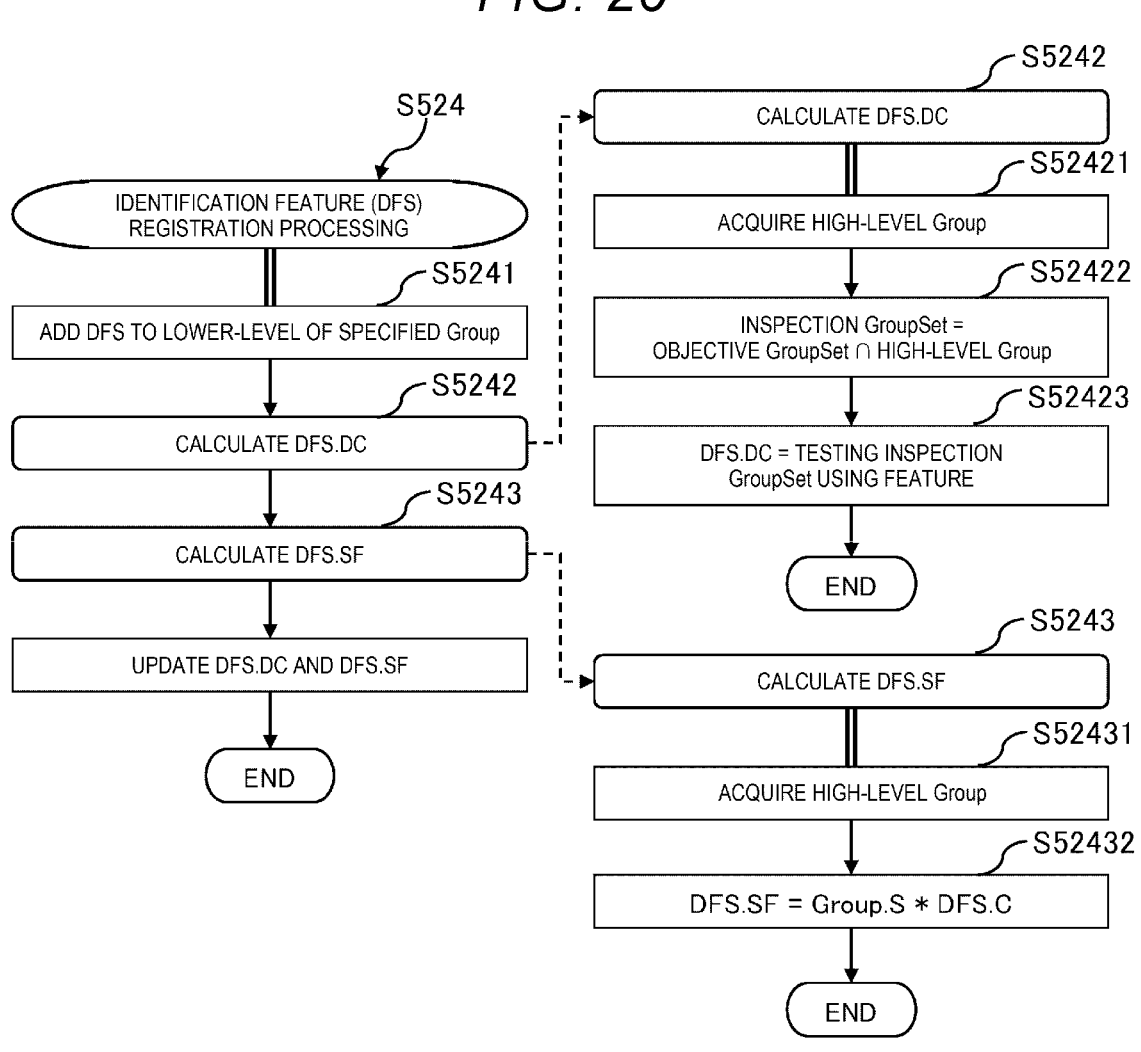
FIG. 20 is a flowchart showing details of identification feature (DFS) registration processing.

FIG. 20 is a flowchart showing details of the identification feature (DFS) registration processing S524 shown in FIG. 15. Hereinafter, the identification feature (DFS) registration processing S524 will be described with reference to FIG. 20.

First, the feature registration unit 133 receives the registration of the identification feature (DFS) from the analyst, and adds the received identification feature (DFS) to a lower level of the variable (Group) of a specified group (S5241).

Next, the feature registration unit 133 obtains accuracy (DFS.DC) of the identification feature (DFS) (S5242). Specifically, first, the feature registration unit 133 acquires the high-level Group of the specified group (S52421), and sets the group belonging to the high-level Group in the variable (inspection GroupSet) indicating the group to be inspected (S52422). Then, a value obtained by testing the inspection GroupSet using the feature is set to DFS.DC (S52423).

Next, the feature registration unit 133 obtains a score (DFS.SF) of the identification feature (DFS) (S5243). Specifically, first, the feature registration unit 133 acquires the high-level Group of the specified group (S52431), and sets a value obtained by multiplying the score (Group.S) of the high-level group by DFS.DC as DFS.SF (S52432).

Next, the feature registration unit 133 updates DFS.DC and DFS.SF to the values obtained as described above (S5244).

Figure 21:
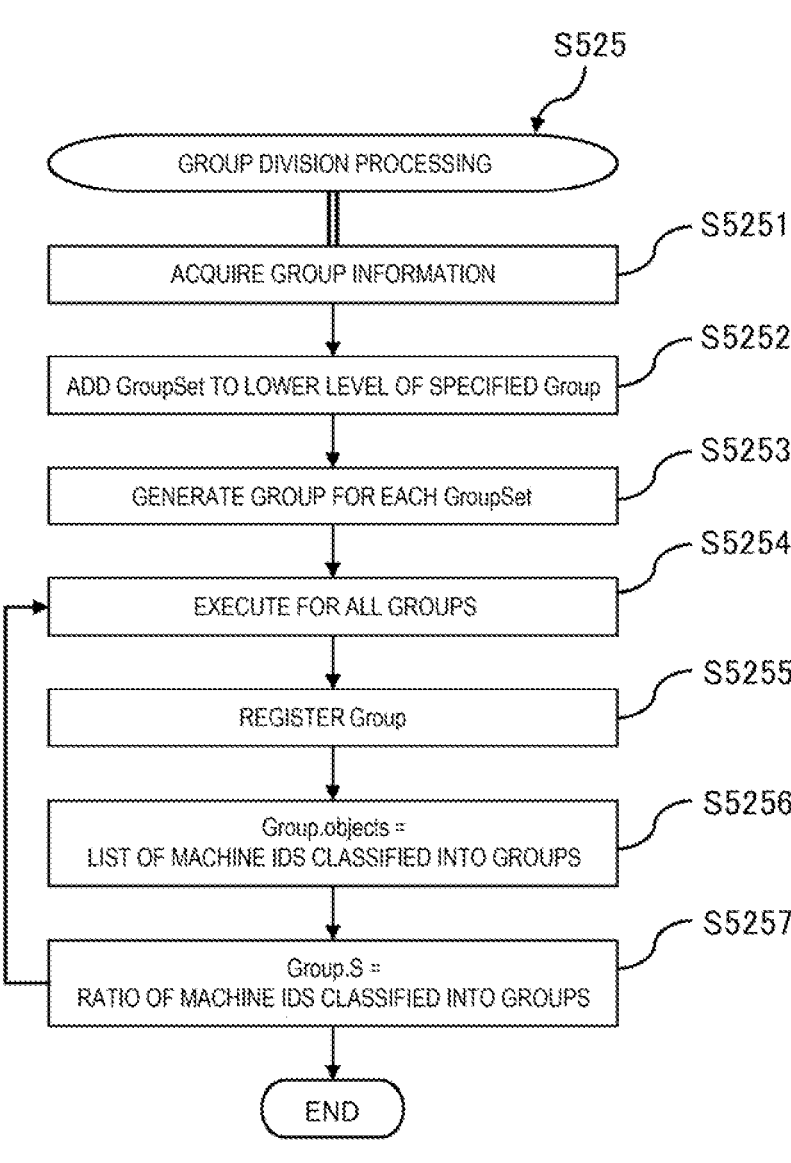
FIG. 21 is a flowchart showing details of group division processing.

FIG. 21 is a flowchart showing details of the group division processing S525 shown in FIG. 15. Hereinafter, the group division processing S525 will be described with reference to FIG. 21.

First, the group registration unit 155 acquires the group information 103 (S5251).

Next, the group registration unit 155 adds the variable (GroupSet) to a lower level of the specified Group (S5252).

Next, the group registration unit 155 generates a group for each GroupSet (S5253).

The subsequent processing of S5254 to 55257 is loop processing executed by sequentially selecting all the groups. In the loop processing, the group registration unit 155 executes Group registration (S5255), setting of the list of machine IDs classified into groups as the variable (Group.objects) (S5256), setting of the ratio of the machine IDs classified into the groups as the variable (Group.S) of the group score (S5257).

Figure 22:
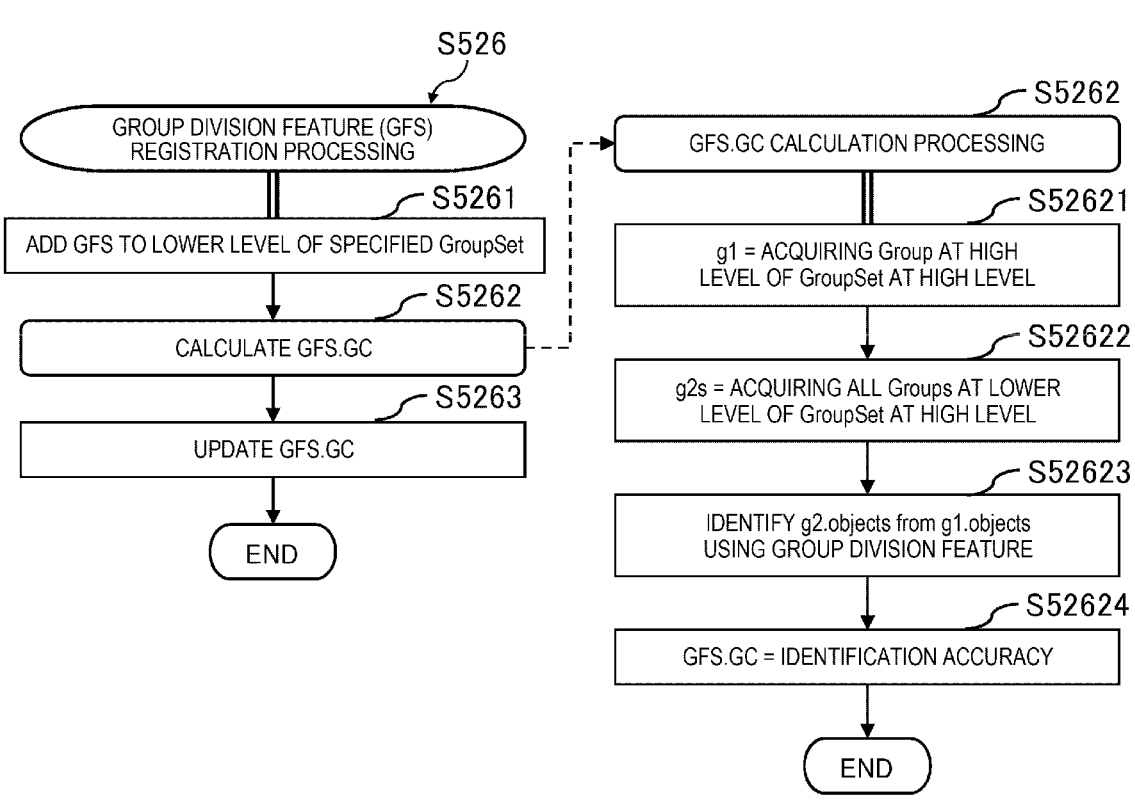
FIG. 22 is a flowchart showing details of group division feature (GFS) registration processing.

FIG. 22 is a flowchart showing details of the group division feature (GFS) registration processing S526 shown in FIG. 15. Hereinafter, the group division feature (GFS) registration processing S526 will be described with reference to FIG. 22.

First, the feature registration unit 133 adds the group division feature (GFS) to a lower level of the specified (GroupSet) (S5261).

Next, the feature registration unit 133 obtains GFS.GC (S5262). Specifically, first, the feature registration unit 133 acquires the Group at the higher level of the GroupSet at the higher level of the variable (g1) (S52621), and acquires all Groups at the lower level of the GroupSet at the higher level of the variable (g2s) (S52622). Then, the feature registration unit 133 identifies g2.objects from g1.objects using the group division features (GFS.features) (S52623), and sets the identification accuracy as the variable (GFS.GC) (S52624).

FIG. 23A is a flowchart showing details of the GFS registration and group division processing S527 based on the GFS shown in FIG. 15. Hereinafter, the GFS registration and group division processing S527 based on the GFS will be described with reference to FIG. 23A.

First, the feature registration unit 133 adds the group division feature (GFS) to a lower level of the specified (GroupSet) and sets the variable (GFS.GC) to 100% (S5271).

Next, the feature registration unit 133 acquires the Group at the higher level of the GroupSet at the higher level of the variable (g1) (S5272), and classifies g1.objects into groups using the group division features (GFS.features) (S5273).

The subsequent processing of S5274 to S5277 is loop processing executed by sequentially selecting all the groups. In the loop processing, the feature registration unit 133 executes Group registration (S5275), setting of the list of machine IDs classified into groups (S5276) as the variable (Group.objects), setting of the ratio of the machine IDs classified into groups as the variable (Group.S) of the group score (S5277).

Figure 23B:
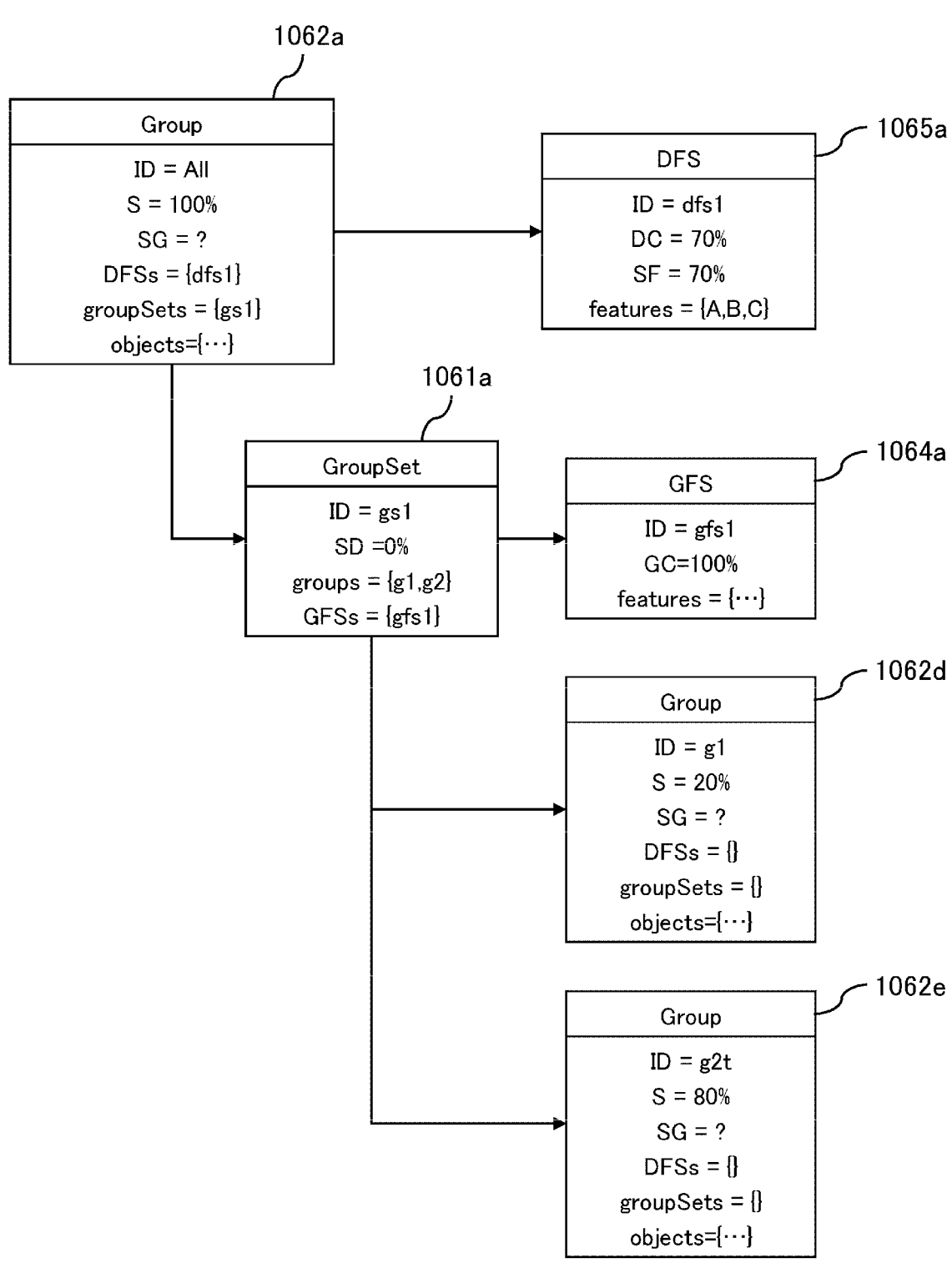
FIG. 23B is an example of the structure of the process tree after the group division feature (GFS) registration processing and the group division processing according to the group division feature (GFS) are executed.

FIG. 23B shows an example of a structure of the process tree 106 after the execution of the GFS registration and group division processing S527 based on the GFS.

Figure 24A:
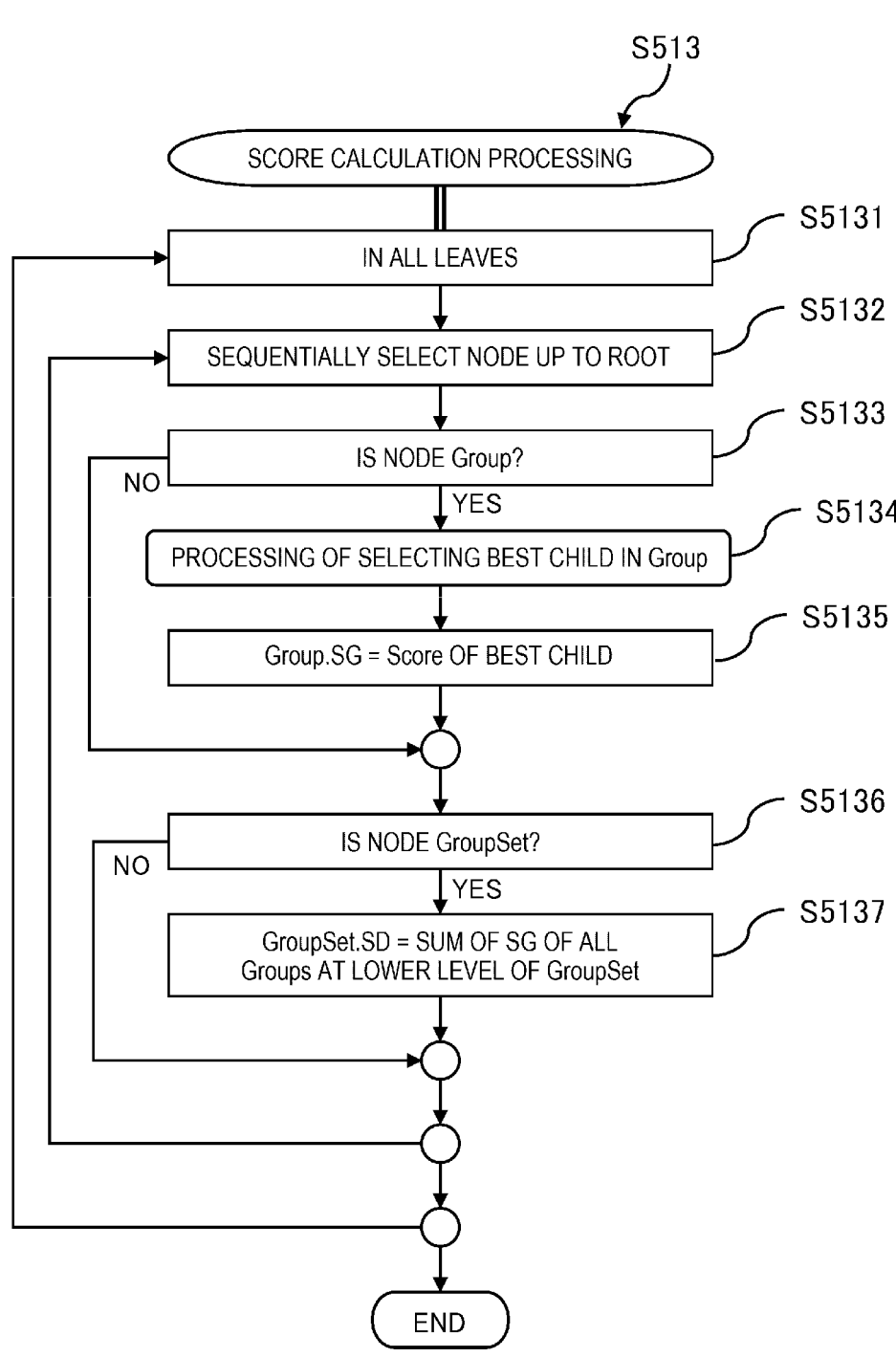
FIG. 24A is a flowchart showing details of score calculation processing.

FIG. 24A is a flowchart showing details of the score calculation processing S513 shown in FIG. 15. Hereinafter, the score calculation processing S513 will be described with reference to FIG. 24A.

In the FIG. 24A, S5131 and S5132 are loop processing of sequentially selecting a node up to a root for all leaves of the process tree 106. In the loop processing, first, the feature score calculation unit 135 determines whether the selected node is a Group (S5133). When the selected node is a group (S5133: YES), the best child in the group is selected (hereinafter, referred to as "processing S5134 of selecting the best child in the group"). On the other hand, when the selected node is not a group (S5133: NO), the processing proceeds to S5136.

FIG. 24B is a flowchart showing details of the processing S5134 of selecting the best child in the group in FIG. 24A.

First, the feature score calculation unit 135 secures a storage region for a set X (S51341).

S51342 to 551343 are loop processing of sequentially selecting and executing all identification features (DFS) at the lower level of the Group. In 551343, the feature score calculation unit 135 sets the selected identification feature (DFS) as the variable (Y.Item), sets DFS.SF as the variable (Y.Score), and adds Y to the set X.

S51344 to 551346 are loop processing for sequentially selecting and executing all GroupSets at the lower level of the Group. In 551345, the feature score calculation unit 135 sets a maximum GFS.GC among all the group division features (GFS) of the GroupSets as the variable (maxGC). In 551346, the feature score calculation unit 135 sets the GroupSets as the variable (Y.Item), sets GroupSet.SD*maxGC as the variable (Y.Score), and adds Y to the set X.

In the subsequent 551347, the feature score calculation unit 135 acquires an Item having the highest Score and the Score from the set X as a return value.

Returning to FIG. 24A, in 55135, the feature score calculation unit 135 sets the Score of the best child, which is the return value of the processing S5134 of selecting the best child in the group, as the variable (Group.SG).

In S5136, the feature score calculation unit 135 determines whether the selected node is the GroupSet. When the selected node is the GroupSet (S5136: YES), the sum of the score SG of all the Groups at the lower level of the GroupSet is set as the variable (GroupSet.SD).

Figure 25:
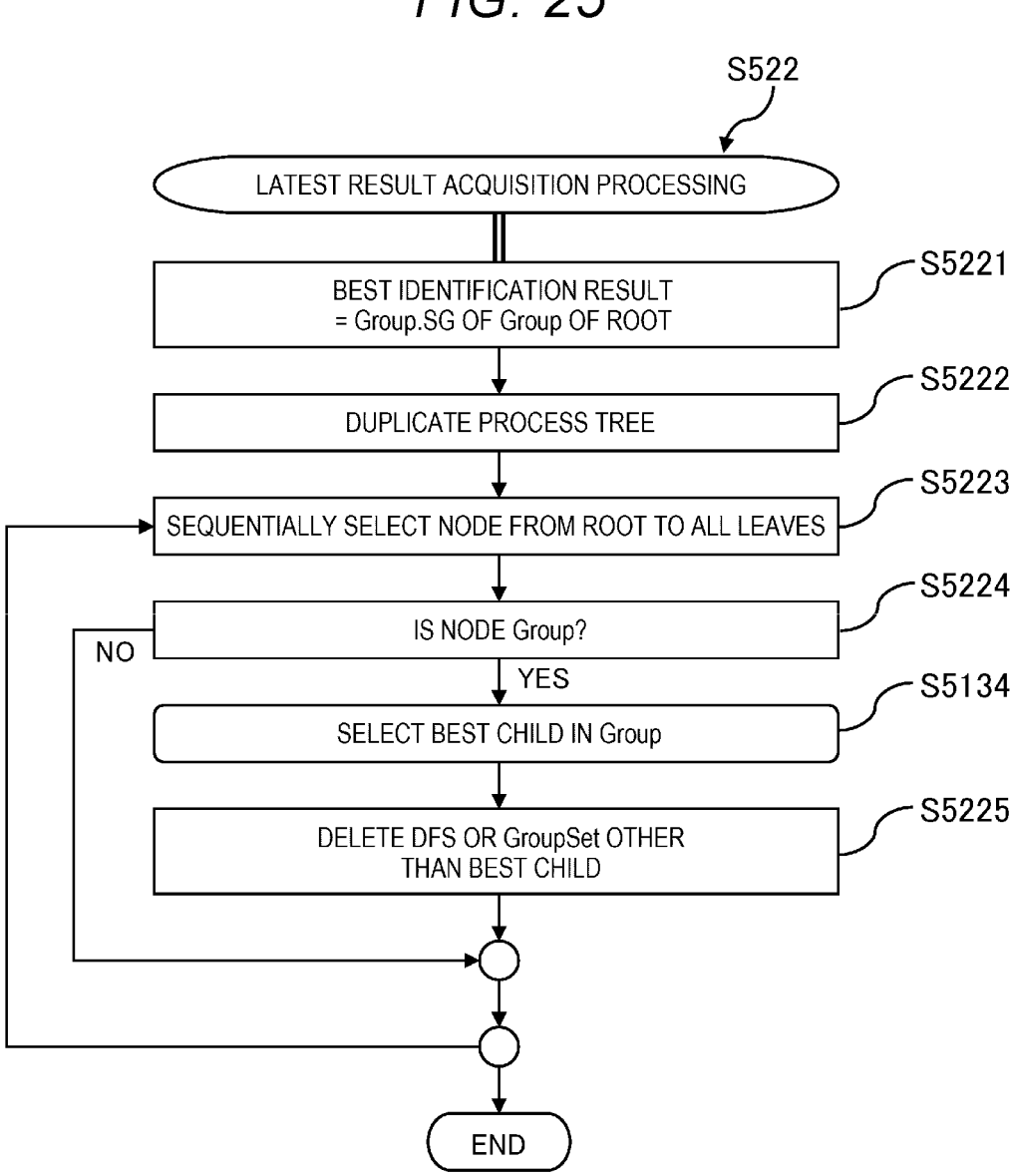
FIG. 25 is a flowchart showing details of latest result acquisition processing.

FIG. 25 is a flowchart showing details of the latest result acquisition processing S522 shown in FIG. 15. Hereinafter, the latest result acquisition processing S522 will be described with reference to FIG. 25.

The result acquisition unit 163 first sets Group.SG of the Group of a root as the variable (best identification result) (S5221).

Next, the result acquisition unit 163 duplicates the process tree 106 (S5222).

S5223 to S5225 are loop processing of sequentially selecting nodes from the root of process tree 106 to all leaves. First, in S5224, the result acquisition unit 163 determines whether the selected node is a group. When the selected node is a group (S5224: YES), the processing S5134 of selecting the best child in the group in FIG. 24B described above is executed, and the identification features (DFS) or GroupSets other than the best child are deleted (S5225).

Figure 26A:
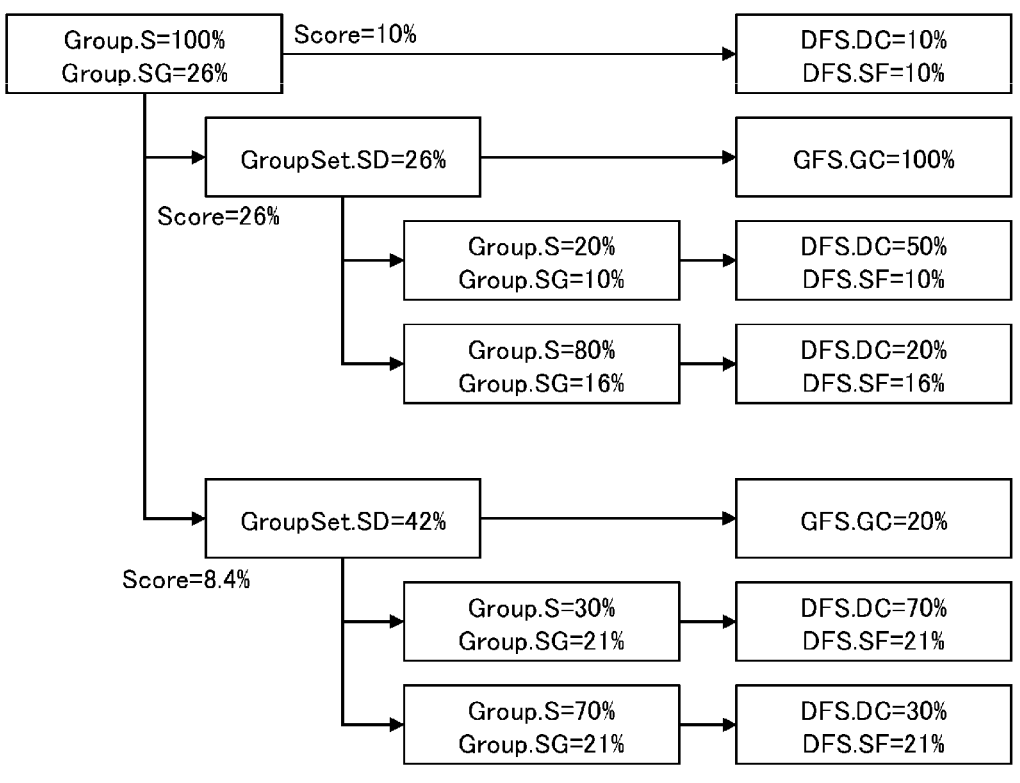
FIG. 26A is a diagram showing a structure of the process tree before the latest result acquisition processing is executed.
Figure 26B:
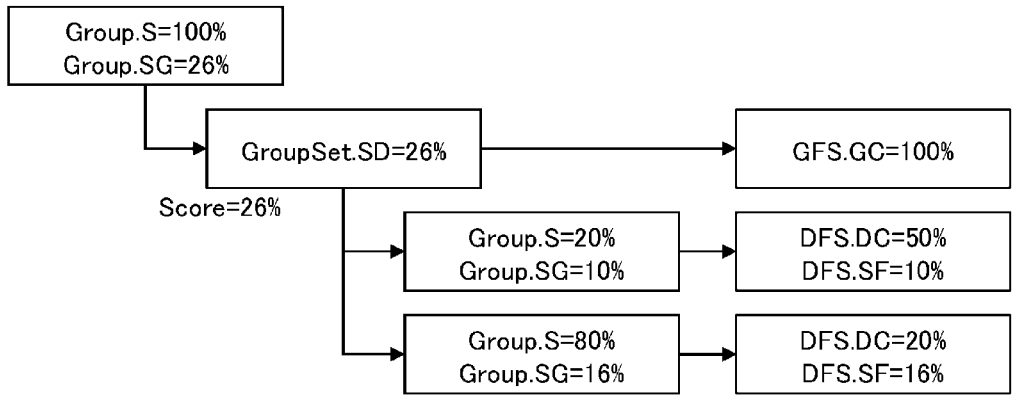
FIG. 26B is a diagram showing a structure of the process tree after the latest result acquisition processing is executed.

FIG. 26A shows an example of the structure of the process tree 106 before the execution of the latest result acquisition processing S522, and FIG. 26B shows an example of the structure of the process tree 106 after the execution of the latest result acquisition processing S522.

Figure 27A:
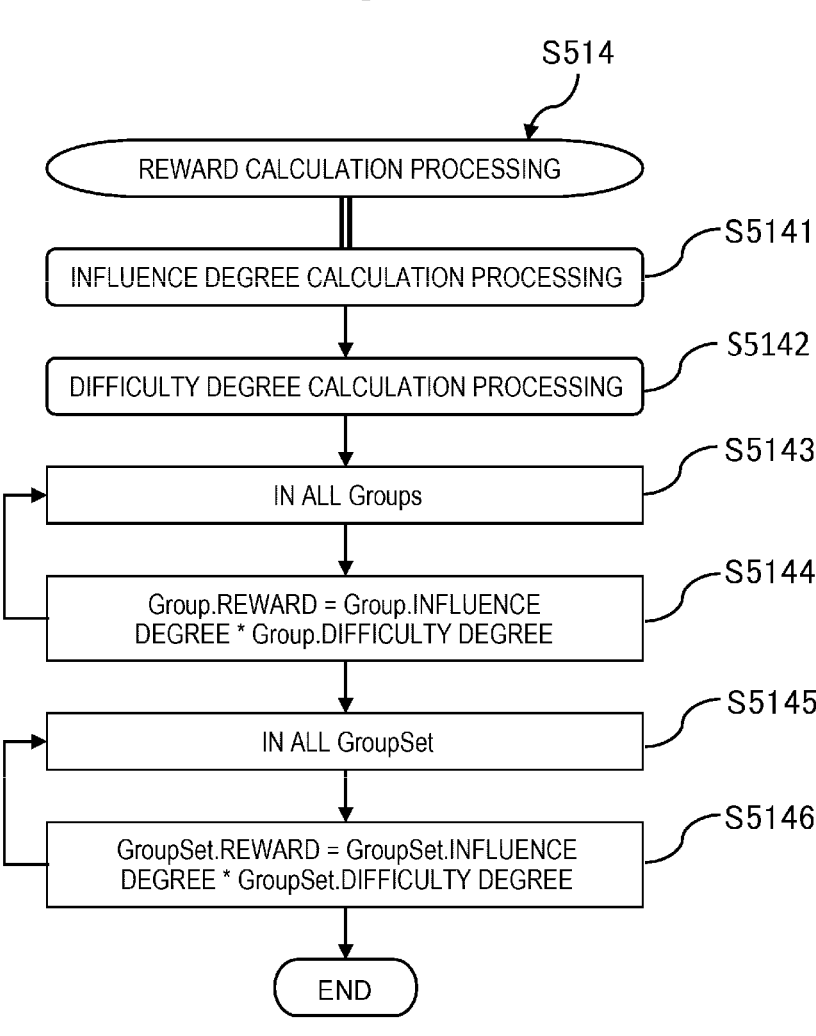
FIG. 27A is a flowchart showing details of reward calculation processing.

FIG. 27A is a flowchart showing details of the reward calculation processing S514 shown in FIG. 15. Hereinafter, the reward calculation processing S514 will be described with reference to FIG. 27A.

First, the reward calculation unit 140 executes influence degree calculation processing 55141.

FIG. 27B is a flowchart showing details of the influence degree calculation processing 55141.

First, the reward calculation unit 140 sets the Group.SG of the group of the root as a variable (Score_all_B) (S51411).

Processing of S51412 to S51416 in FIG. 27B are loop processing for sequentially selecting a group from all the groups. First, the reward calculation unit 140 sets the Group.SG as a variable (Score_B) (S51413). Next, the reward calculation unit 140 sets Score_B+constant X as a variable (Score_A) (S51414). Next, the reward calculation unit 140 performs the score calculation processing S513 shown in FIG. 24A. Next, the reward calculation unit 140 sets the Group.SG of the Group of the root as a variable (Score_all_A) (S51415). Next, the reward calculation unit 140 sets (Score_all_A−Score_all_B)/(Score_A−Score_B) as a variable (DC influence degree) (S51416).

Processing of S51417 to S514102 in FIG. 27B is loop processing of sequentially selecting a GroupSet from all the GroupSets. First, the reward calculation unit 140 sets max (GFS.GC for all GFS) as a variable (Score_B) (S51418). The reward calculation unit 140 sets Score_B+constant X as the variable (Score_A) (S51419). Next, the reward calculation unit 140 executes the score calculation processing S513 shown in FIG. 24A. Next, the reward calculation unit 140 sets the Group.SG of the group of the root as the variable (Score_all_A) (S514101). Next, the reward calculation unit 140 sets (Score_all_A−Score_all_B)/(Score_A−Score_B) as a variable (GC influence degree) (S514102).

Returning to FIG. 27A, next, the reward calculation unit 140 executes difficulty degree calculation processing S5142.

Figure 27C:
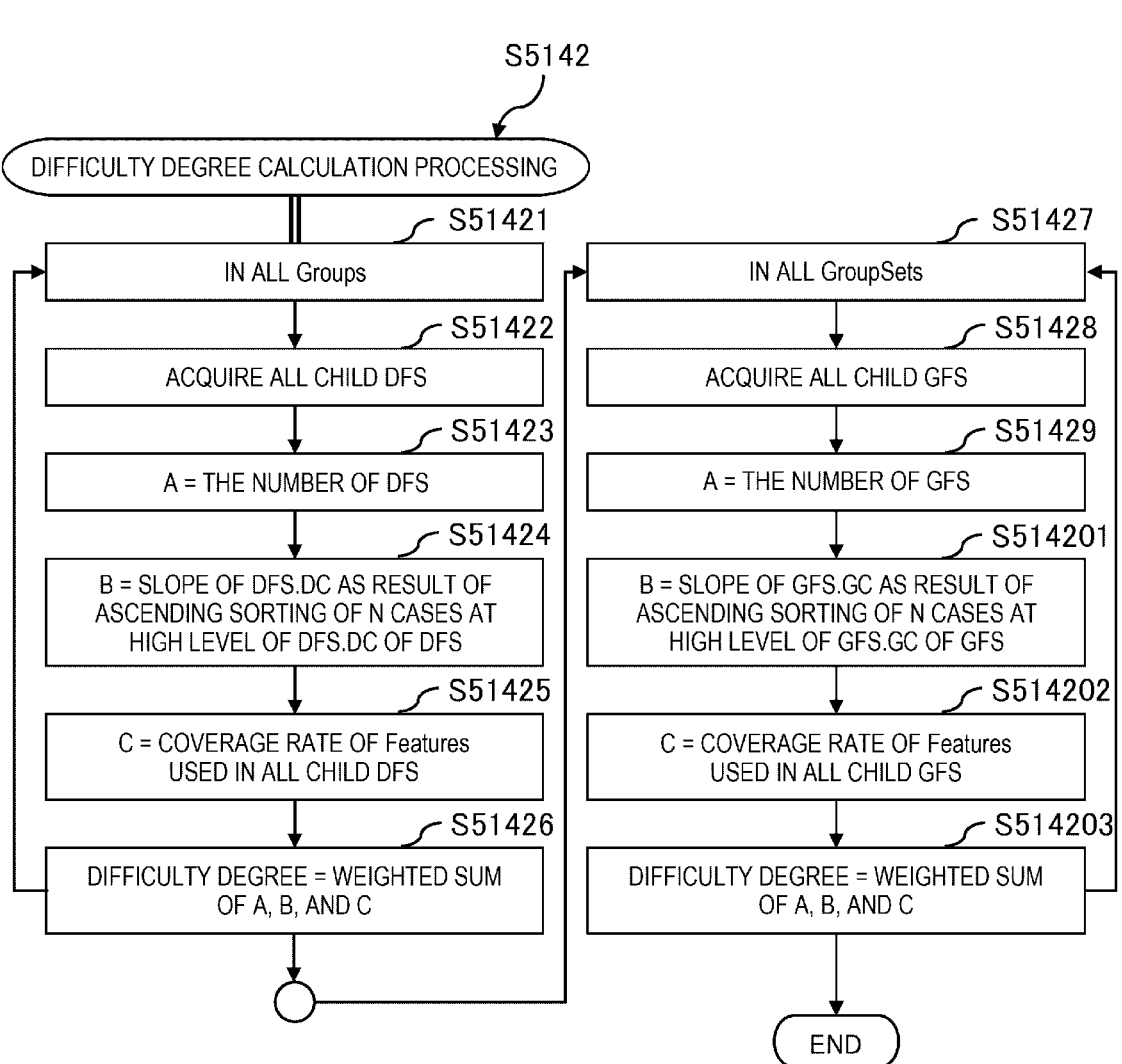
FIG. 27C is a flowchart showing details of difficulty degree calculation processing in FIG. 27A.

FIG. 27C is a flowchart showing details of the difficulty degree calculation processing S5142. Processing of S51421 to S51426 in FIG. 27C is loop processing of sequentially selecting, from all the groups, a group and child identification features (DFS) of all the groups. First, the reward calculation unit 140 sets the number of the identification features (DFS) as the variable (A) (S51423). Next, the reward calculation unit 140 sets a slope of DFS.DC as a result of ascending sorting of N cases at the high level of DFS.DC of the identification feature (DFS) as the variable (B) (S51424). Next, the reward calculation unit 140 sets a coverage rate (for example, coverage rate ascertained based on the history of trial and error of the identification feature (DFS)) of the features used in all the child identification feature (DFS) as the variable (C) (S51425). Next, the reward calculation unit 140 sets a weighted sum of A, B, and C as the variable (difficulty degree) (S51426).

Processing of S51427 to S514203 is loop processing of sequentially selecting, from all the groups, a group and child group division features (GFS) of all the groups. First, the reward calculation unit 140 sets the number of the group division feature (GFS) as the variable (A) (S51429). Next, the reward calculation unit 140 sets a slope of GFS.GC as a result of ascending sorting of N cases at the high level of GFS.GC of the group division feature (GFS) as the variable (B) (S514201). Next, the reward calculation unit 140 sets a coverage rate of the feature used in all the child group division features (GFS) as the variable (C) (S514202). Next, the reward calculation unit 140 sets a weighted sum of A, B, and C as the variable (difficulty degree) (S514203).

Returning to FIG. 27A, the reward calculation unit 140 then calculates influence degree of Group*difficulty degree of Group for all the groups to obtain the group (reward of Group) (S5145).

Next, the reward calculation unit 140 calculates influence degree of GroupSet*difficulty degree of GroupSet for all the groups (GroupSet) to obtain the group (reward of GroupSet) (S5146).

Figure 28B:
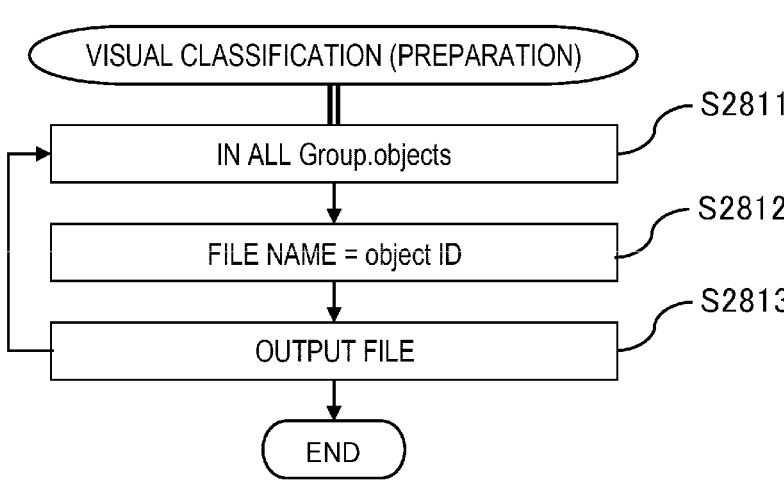
FIG. 28B is a flowchart showing preparation processing for the classification in FIG. 28A.
Figure 28C:
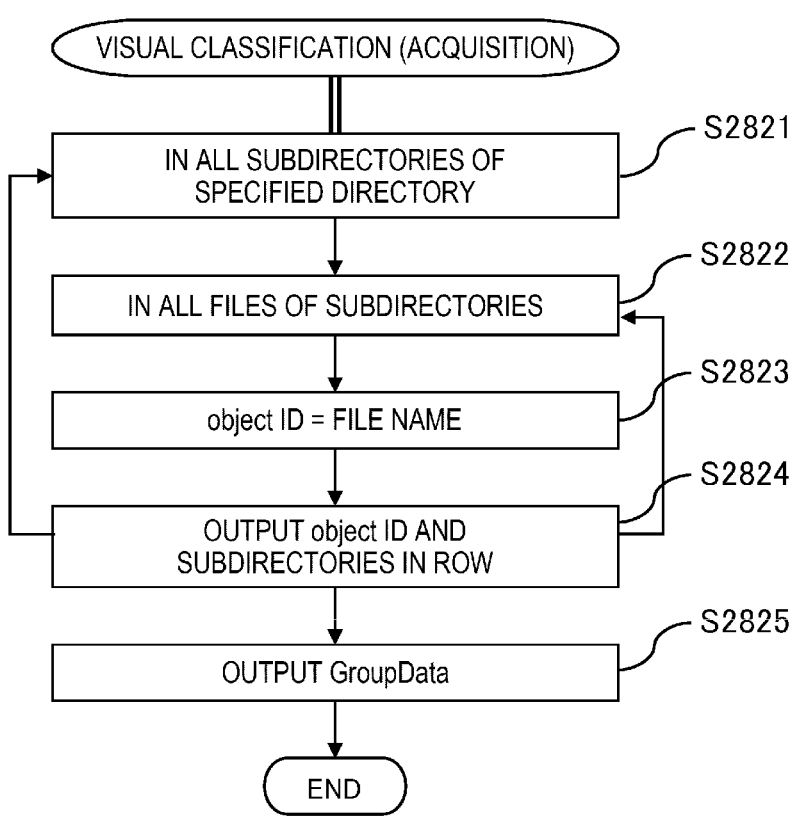
FIG. 28C is a flowchart showing group information generation processing in FIG. 28A.

FIGS. 28A to 28C are diagrams showing a case in which the group setting unit 138 shown in FIG. 9 divides the time-series data into groups based on a result of visually classifying the time-series data by the analyst or the like. As shown in FIG. 28A, in this example, the analyst or the like visually determines the waveform (whether the waveform is closer to a parabola or a straight line) (reference numeral 2810), classifies the time-series data into either the parabola or the straight line based on a result of the determination, and generates group information 103*c*.

FIG. 28B is a flowchart showing a case in which the group setting unit 138 outputs a file for all the machines (Group.objects) belonging to the group when the operation of the reference numeral 2810 shown in FIG. 28A is performed. The group setting unit 138 generates a file in which the machine ID is set in the file name for all the machines belonging to the group (S2811 to S2813).

FIG. 28C is a flowchart showing processing in which the group setting unit 138 generates the group information 103*c* shown in FIG. 28A. Processing of S2821 to S2824 is loop processing of sequentially selecting all files in all subdirectories of a specified directory. In the above loop processing, the group setting unit 138 sets a selected file name to the machine ID (S2823), and generates a record for the machine ID and the subdirectories (S2824). In 52825, the group setting unit 138 outputs a generated record group as the group information 103*c*.

Figure 29A:
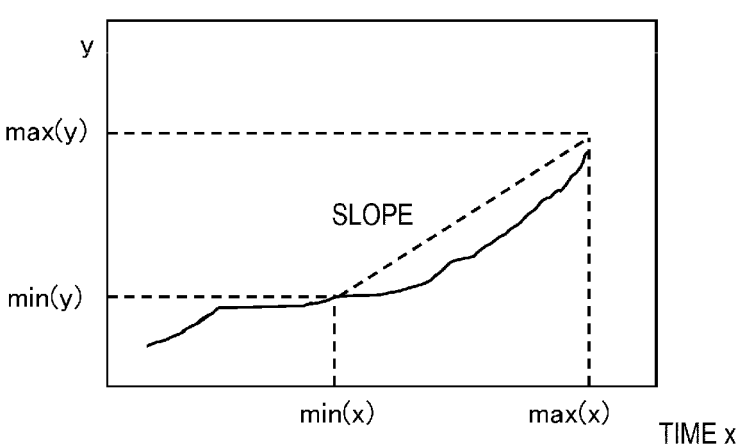
FIG. 29A is a diagram showing an example of a generation method for the feature table.
Figure 29B:
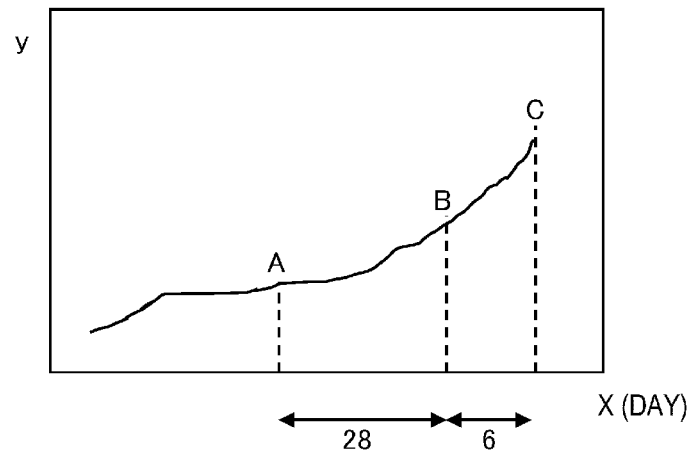
FIG. 29B is a diagram showing an example of the generation method for the feature table.

FIGS. 29A and 29B are diagrams showing an example of a generation method for the feature table 105. FIG. 29A shows a case in which a slope (=(max(y)−min (y))/(max (x)−min(x))) of the time-series data in a section from a time min(X) to a time max(X) is set as the feature. A period of the time-series data used for feature calculation does not adopt, for example, a latest predetermined period (6 days from B to C in FIG. 29B) in order to catch a sign of a failure, as shown in FIG. 29B.

FIG. 30 shows an example when the feature is described in a predetermined algorithm description language.

Figure 31:
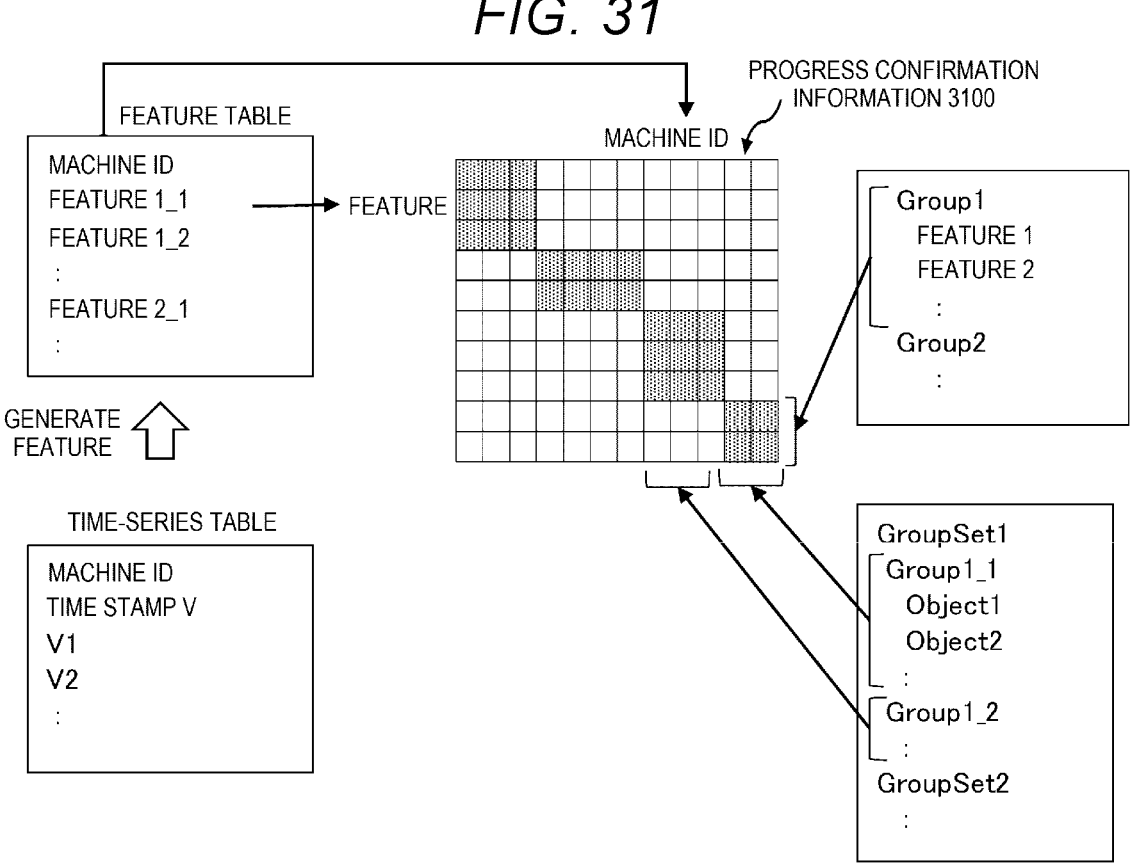
FIG. 31 is an example of progress checking information.

FIG. 31 is an example of information presented to the analyst or the like by the progress checking unit 160 of the model construction support device 100. The progress checking unit 160 manages, based on the history of processing executed on the process tree 106, information on a status (a progress status of prediction model construction work) of trial and error for searching for the feature and dividing explanatory variables (time-series data) into groups by the analyst or the like. The progress checking unit 160 generates a graph (hereinafter, referred to as "progress checking information 3100") shown in FIG. 31 based on the above information in the progress checking information display processing S521 described above, and presents (displays) the generated progress checking information 3100 to the analyst or the like.

As shown in FIG. 31, regarding the progress checking information 3100, the machine IDs of machines are listed by a group in a horizontal axis direction, and various features acquired for the machines are listed in a vertical axis direction. In each cell located at an intersection of the machine ID and the feature, a predetermined color (black in the diagram) is displayed with a density (or color) according to the magnitude of the difference between the feature of the machine ID and the average value of the entire device. In the progress checking information 3100, the denser a dense region, the higher the contribution of the feature to the improvement of the identification accuracy of the objective variable, and the larger the number of regions as described above, the more appropriately the search for the feature and grouping progresses. Therefore, the analyst or the like can easily visually check the feature for the prediction model construction and a progress degree of the grouping search by referring to the progress checking information 3100.

Figure 32:
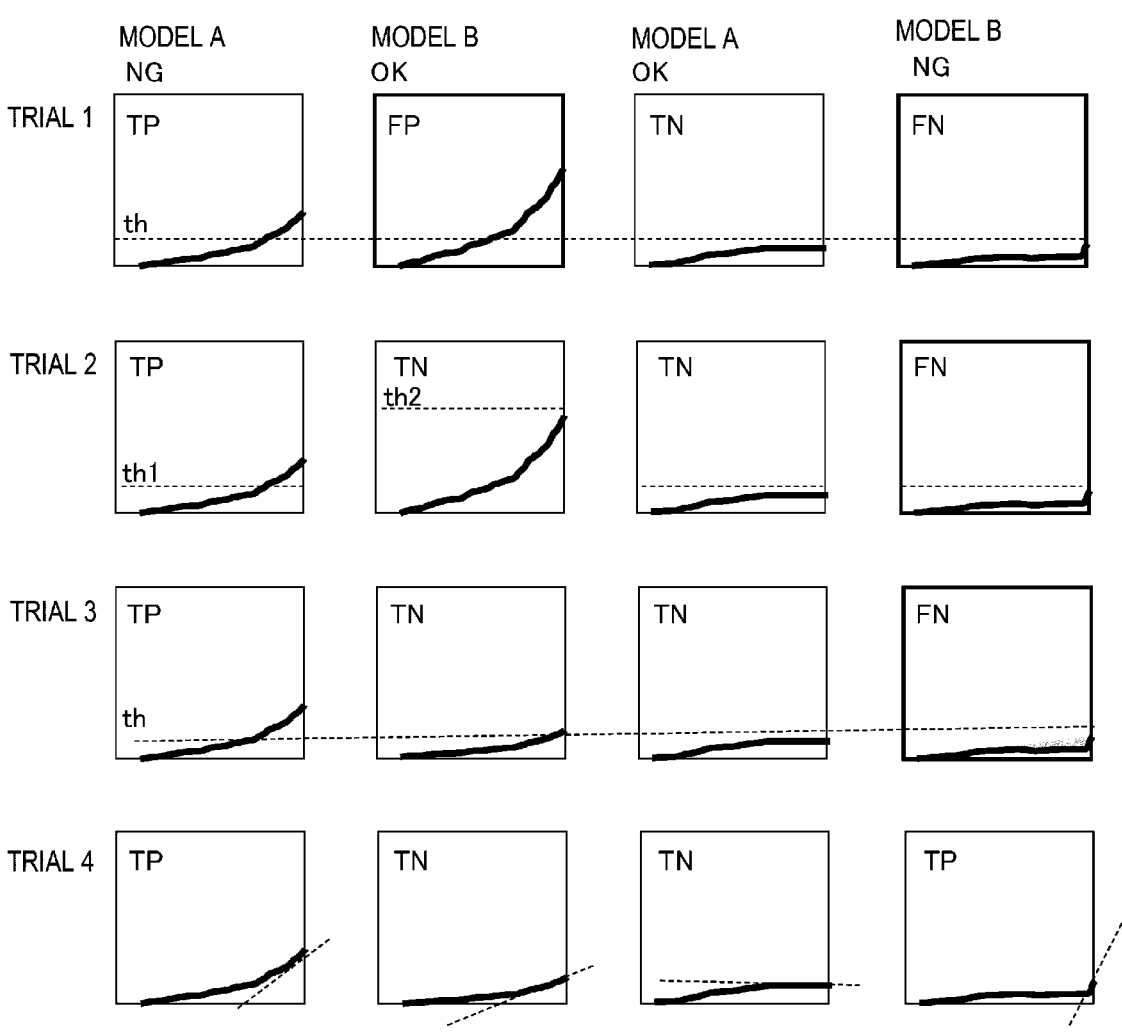
FIG. 32 is a diagram showing a case in which the feature is searched by trial and error.

FIG. 32 shows an example in which an appropriate feature is searched by trial and error. In a trial 1, an objective variable (whether a failure is present) is determined (identified) based on a threshold value (th1). In this case, an error occurs in the determination of second and fourth pieces of time-series data from the left. In a trial 2, the threshold value used to determine the second piece of time-series data from the left is adjusted to th2. Accordingly, the determination of the second piece of time-series data from the left is correct, but the determination of the fourth piece of time-series data from the left is still incorrect. In a trial 3, although the threshold value (th1) is applied after the four pieces of time-series data are standardized, the determination of the fourth piece of time-series data from the left is still incorrect. In a trial 4, four pieces of time-series data are standardized and the determination is executed depending on whether the magnitude of the slope exceeds the threshold value. In this example, the correct determination is executed for all of the time-series data. In this example, the feature and the grouping score for the trial 4 is maximized.

As described above, according to the model construction support system 1 in the present embodiment, various types of information are provided from various viewpoints. The various types of information are useful for supporting the search for the feature to be adopted for the prediction model that outputs the objective variable related to the predicted event for the machine and the division method for dividing the explanatory variables into groups to optimize the feature. Therefore, the analyst or the like can efficiently execute the construction of the prediction model for accurately predicting an event occurring on the machine such as a failure.

The invention is not limited to the above embodiment, and various modifications can be made without departing from the gist of the invention. For example, the embodiment described above is described in detail for easy understanding of the invention, and the invention is not necessarily limited to those including all the configurations described above. Other configurations can be added to, eliminated from, or replaced with a part of the configurations according to the above embodiment.

For example, in the above embodiment, although a risk prediction model is constructed by a linear regression model, the risk prediction model may be constructed by, for example, another type of statistical model, a machine learning model (for example, a deep neural network (DNN)), or the like.

A part of or all of the above configurations, functional units, processing units, processing methods, and the like may be implemented by hardware by, for example, being designed with an integrated circuit. The configurations, functions, and the like may also be implemented by software by a processor interpreting and executing a program for implementing the functions. Information such as a program, a table, and a file for implementing the functions can be stored in a recording device such as a memory, a hard disk, or a solid state drive (SSD), or in a recording medium such as an IC card, an SD card, or a DVD.

Arrangement forms of various functional units, various processing units, and various databases of the various information processing devices described above are merely examples. The arrangement forms of the various functional units, the various processing units, and the various databases can be changed to an optimum arrangement form from viewpoints of performance, processing efficiency, communication efficiency, and the like of hardware and software that are provided in the devices.

A configuration (schema or the like) of the database storing various types of data can be flexibly changed from viewpoints of efficient utilization of resources, improvement of processing efficiency, improvement of access efficiency, improvement of search efficiency, and the like.

What is claimed is:

1. A model construction support system, which is an information processing system configured to support searching for an identification feature used to construct a prediction model that outputs an objective variable related to a predicted event for a machine based on input explanatory variables, and a division method for dividing the explanatory variables into groups to improve calculation accuracy of the objective variable based on the prediction model, wherein the explanatory variables comprise sensor data collected from a plurality of sensor devices that measure operational parameters of the machine, wherein the machine operates with multiple failure modes and operation modes, the model construction support system comprising:

an information processing device including a processor and a storage element, wherein the explanatory variables are divided into a plurality of groups, and accuracy C of the identification feature is calculated when the identification feature is set based on the explanatory variable in each of the groups, and a score SF of the identification feature in each of the groups is calculated based on the accuracy C of the identification feature and a support ratio S that is a ratio of the explanatory variable in each of the groups to all of the explanatory variables before division to generate information based on the calculated score SF, wherein the processor functions as a feature formula registration unit that executes processing by providing a user interface for setting of a feature library in which information about the identification feature is managed.

2. The model construction support system according to claim 1, wherein accuracy D of a group division feature used to divide the explanatory variables into the groups is calculated, and a score SG in each of the groups is calculated based on the score SF and the accuracy D in each of the groups to generate information based on the calculated score SF.

3. The model construction support system according to claim 2, wherein a score SD, which is a score for the division method obtained by totaling the score SG, is calculated.

4. The model construction support system according to claim 3, wherein information based on at least one of the score SF, the score SG, and the score SD is generated on a graph showing the group, the division method, and the feature in a tree structure.

5. The model construction support system according to claim 3, wherein a reward that is a value serving as an index for improving the identification feature and the group division feature is calculated based on an influence degree that is a value indicating a degree of influence of the score SG or the score SF used for totaling the score SD on the score SD.

6. The model construction support system according to claim 5, wherein information indicating history of searching for the identification feature is stored, and a probability of success, which is a probability that the identification feature improving the accuracy C to be obtained based on the history is to be searched in future, is reflected on the reward.

7. The model construction support system according to claim 6, wherein the probability of success is calculated based on a number of the features searched in the past or a quantity of the explanatory variables used in past during searching for the feature.

8. The model construction support system according to claim 5, wherein information based on at least one of the accuracy C, the support ratio S, the score SF, the score SG, the score SD, and the reward is generated on a graph showing the group, a type of division, and the feature in a tree structure and is output.

9. The model construction support system according to claim 1, wherein a plurality of the machines are listed by a group in a horizontal axis direction, the feature acquired for the machines is listed in a vertical axis direction, and in each cell located at an intersection of the machine and the feature, information displayed in density or color according to magnitude of a difference between the feature of the machines and an average value of all the machines is generated.

10. A model construction support method, which is an information processing method executed by an information processing system configured to support searching for an identification feature used to construct a prediction model that outputs an objective variable related to a predicted event for a machine based on input explanatory variables, and a division method for dividing the explanatory variables into groups to improve calculation accuracy of the objective variable based on the prediction model, wherein the explanatory variables comprise sensor data collected from a plurality of sensor devices that measure operational parameters of the machine, wherein the machine operates with multiple failure modes and operation modes, the model construction support method comprising:

a step of dividing, by an information processing device including a processor and a storage element, the explanatory variables into a plurality of groups, and calculating, by the information processing device, accuracy C of the identification feature when the identification feature is set based on the explanatory variable in each of the groups; and a step of calculating, by the information processing device, a score SF of the identification feature in each of the groups based on the accuracy C of the identification feature and a support ratio S that is a ratio of the explanatory variable in each of the groups to all of the explanatory variables before division to generate information based on the calculated score SF, wherein the processor functions as a feature formula registration unit that executes processing by providing a user interface for setting of a feature library in which information about the identification feature is managed.

11. The model construction support method according to claim 10, further comprising:

a step of calculating, by the information processing device, accuracy D of a group division feature used to divide the explanatory variables into the groups; and a step of calculating, by the information processing device, a score SG in each of the groups based on the score SF and the accuracy D in each of the groups to generate information based on the calculated score SF.

12. The model construction support method according to claim 11, further comprising a step of calculating, by the information processing device, a score SD which is a score for the division method obtained by totaling the score SG.

13. The model construction support method according to claim 12, further comprising a step of generating, by the information processing device, information based on at least one of the score SF, the score SG, and the score SD on a graph showing the group, the division method, and the feature in a tree structure.

14. The model construction support method according to claim 12, further comprising a step of calculating, by the information processing device, a reward that is a value serving as an index for improving the identification feature and the group division feature, based on an influence degree that is a value indicating a degree of influence of the score SG or the score SF used for totaling the score SD on the score SD.

15. The model construction support method according to claim 14, further comprising:

a step of storing, by the information processing device, information indicating history of searching for the identification feature; and a step of reflecting, by the information processing device, a probability of success, which is a probability that the identification feature improving the accuracy C to be obtained based on the history is to be searched in future, on the reward.

16. The model construction support system according to claim 1, wherein the machine comprises a storage drive, and wherein the explanatory variables comprise sensor data collected from a plurality of sensor devices that measure temperature, rotation speed, data read speed, data write speed, input/output per second (IOPS), response time, throughput, latency, and remaining capacity of the storage drive.

17. The model construction support system according to claim 1, wherein the explanatory variables are divided into groups based on different failure modes and operation modes, wherein a sign of failure may be buried due to differences in product types or operation modes, and wherein dividing the explanatory variables into a plurality of groups enables searching for features in group units to improve prediction accuracy.

18. The model construction support system according to claim 1, wherein the system is configured to predict machine failures in a data center or system center operating tens of thousands of storage drives, and wherein accurate prediction of failures enables preventing troubles in advance and efficiently operating the system.

19. The model construction support system according to claim 1, wherein the system handles complex failure prediction scenarios involving multiple failure modes and operation modes, and wherein the system improves upon conventional identification methods such as decision trees, random forests, and XGBoost by enabling identification of failure signs when failure frequency is low and operation modes vary.

20. The model construction support system according to claim 1, wherein the system supports iterative construction of the prediction model by:

repeating trial and error of division into groups and generation of identification features in group units;

calculating scores when explanatory variables are given to prediction models constructed based on the groups;

calculating rewards that serve as indices for improving the groups and identification features; and generating model construction support information on a graph showing the group, type of division, and features in a tree structure, and wherein the model construction support system further comprises the user interface provided for a user to interact with the model construction support system based on the graph.

* * * * *